United States Patent
Kneifl et al.

(10) Patent No.: US 12,269,330 B2
(45) Date of Patent: Apr. 8, 2025

(54) INTEGRATED VEHICLE COVER

(71) Applicant: Tectum Holdings, Inc., Ann Arbor, MI (US)

(72) Inventors: Kelly Kneifl, Yankton, SD (US); Robert Gaarder, West Bloomfield, MI (US); Jerome Facchinello, Grand Blanc, MI (US); Daniel J. Delaney, Pinckney, MI (US); Robbie Mosingo, Saline, MI (US); Chad Carter, Manchester, MI (US)

(73) Assignee: EXTANG CORPORATION, Ann Arbor, MI (US)

( * ) Notice: Subject to any disclaimer, the term of this patent is extended or adjusted under 35 U.S.C. 154(b) by 134 days.

(21) Appl. No.: 18/203,203

(22) Filed: May 30, 2023

(65) Prior Publication Data

US 2023/0294495 A1    Sep. 21, 2023

Related U.S. Application Data

(63) Continuation of application No. 17/318,068, filed on May 12, 2021, now Pat. No. 11,701,954.

(Continued)

(51) Int. Cl.
| | |
|---|---|
| *B60J 7/12* | (2006.01) |
| *B60J 7/14* | (2006.01) |
| *B60P 7/02* | (2006.01) |
| *B62D 33/03* | (2006.01) |
| *B60J 7/19* | (2006.01) |

(52) U.S. Cl.
CPC ............. *B60J 7/1204* (2013.01); *B60J 7/141* (2013.01); *B62D 33/03* (2013.01); *B60J 7/198* (2013.01); *B60P 7/02* (2013.01)

(58) Field of Classification Search
CPC . B60J 7/1204; B60J 7/141; B60J 7/198; B60J 7/062; B60J 7/065; B60J 7/068; B60J 7/085; B60J 7/1607; B60P 7/02; B60P 7/04
See application file for complete search history.

(56) References Cited

U.S. PATENT DOCUMENTS

| | | | |
|---|---|---|---|
| 6,874,838 | B2 | 4/2005 | De Gaillard |
| 9,914,344 | B1 | 3/2018 | Stull et al. |

(Continued)

FOREIGN PATENT DOCUMENTS

CA    3078752 A1    4/2019

OTHER PUBLICATIONS

Canadian Office Action against Canadian Application No. 3,118,257, dated Aug. 24, 2022.

(Continued)

*Primary Examiner* — Gregory A Blankenship

(57) ABSTRACT

A method of operating a tonneau cover and a tailgate of a vehicle, including: transmitting one or more signals to a first control module to open or lower the tailgate; determining a position of the tonneau cover with the first control module or a second control module and transmitting by the first control module and/or the second control module one or more signals to a mechanism associated with the tonneau cover to open the tonneau cover if the tonneau cover is determined by the first control module and/or the second control module to be in a closed position; and then lowering the tailgate.

20 Claims, 9 Drawing Sheets

Related U.S. Application Data

(60) Provisional application No. 63/024,585, filed on May 14, 2020.

(56) References Cited

U.S. PATENT DOCUMENTS

| | | | |
|---|---|---|---|
| 11,220,301 B2 | 1/2022 | Robinson et al. | |
| 11,492,836 B2 | 11/2022 | Salter et al. | |
| 11,701,954 B2* | 7/2023 | Kneifl | B60J 7/141 |
| | | | 296/100.1 |
| 2003/0227188 A1 | 12/2003 | De Gaillard | |
| 2004/0164578 A1 | 8/2004 | Mack et al. | |
| 2005/0073167 A1* | 4/2005 | De Gaillard | B60R 5/04 |
| | | | 296/76 |
| 2016/0160553 A1 | 6/2016 | Nania | |
| 2016/0236552 A1 | 8/2016 | Hannan et al. | |
| 2017/0101138 A1 | 4/2017 | Povinelli et al. | |
| 2017/0217294 A1 | 8/2017 | Lutzka et al. | |
| 2018/0009363 A1 | 1/2018 | Loew et al. | |
| 2018/0134132 A1 | 5/2018 | Nania | |
| 2018/0201107 A1 | 7/2018 | Lawson | |
| 2019/0054809 A1 | 2/2019 | Bernardo | |
| 2019/0128042 A1 | 5/2019 | Junod | |
| 2019/0193536 A1* | 6/2019 | Pompili | B60J 7/141 |
| 2019/0375467 A1 | 12/2019 | Tyagi et al. | |
| 2020/0141171 A1 | 5/2020 | Ghannam et al. | |
| 2020/0362617 A1* | 11/2020 | Williams | G01L 5/00 |
| 2021/0025216 A1* | 1/2021 | Salter | B62D 33/03 |
| 2021/0155086 A1 | 5/2021 | Pattabhiraman et al. | |
| 2021/0229537 A1 | 7/2021 | Piche | |
| 2021/0246708 A1* | 8/2021 | Mönig | B62D 33/0273 |
| 2021/0354537 A1* | 11/2021 | Kneifl | B62D 33/03 |
| 2021/0388660 A1 | 12/2021 | Junod | |
| 2021/0394596 A1* | 12/2021 | Jocz | B60J 7/0573 |
| 2022/0141423 A1 | 5/2022 | Schondorf et al. | |
| 2022/0212525 A1 | 7/2022 | King | |
| 2022/0212603 A1 | 7/2022 | Castro et al. | |
| 2022/0324311 A1 | 10/2022 | Brumleve | |
| 2022/0381067 A1* | 12/2022 | Noiri | B62D 33/03 |
| 2023/0294495 A1* | 9/2023 | Kneifl | B62D 33/0273 |
| | | | 296/100.1 |
| 2024/0217321 A1* | 7/2024 | Himmatramka | B60J 7/141 |

OTHER PUBLICATIONS

Canadian Office Action dated Mar. 30, 2023, for Canadian Patent Application No. 3,118,257.

* cited by examiner

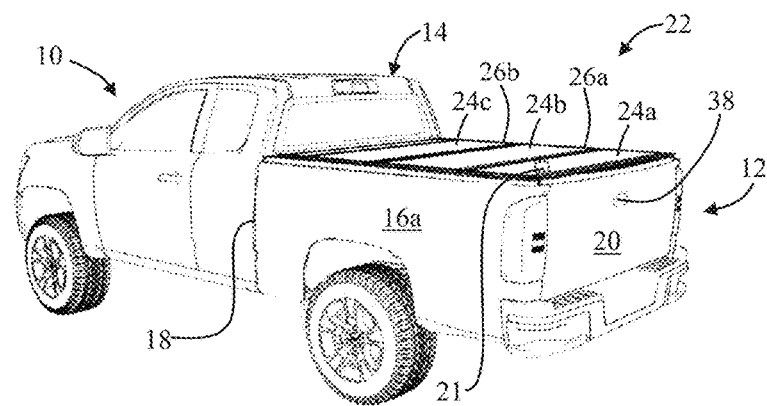
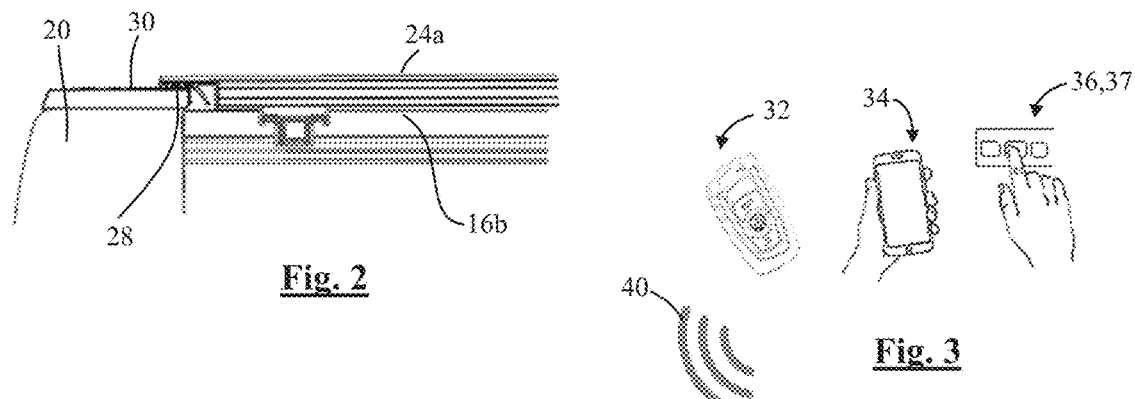
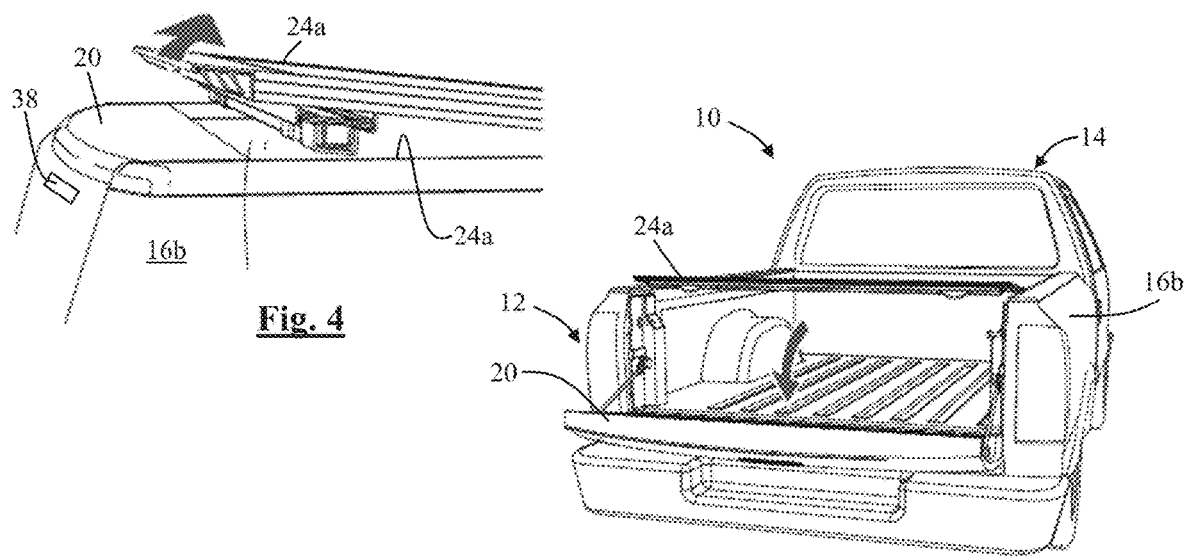

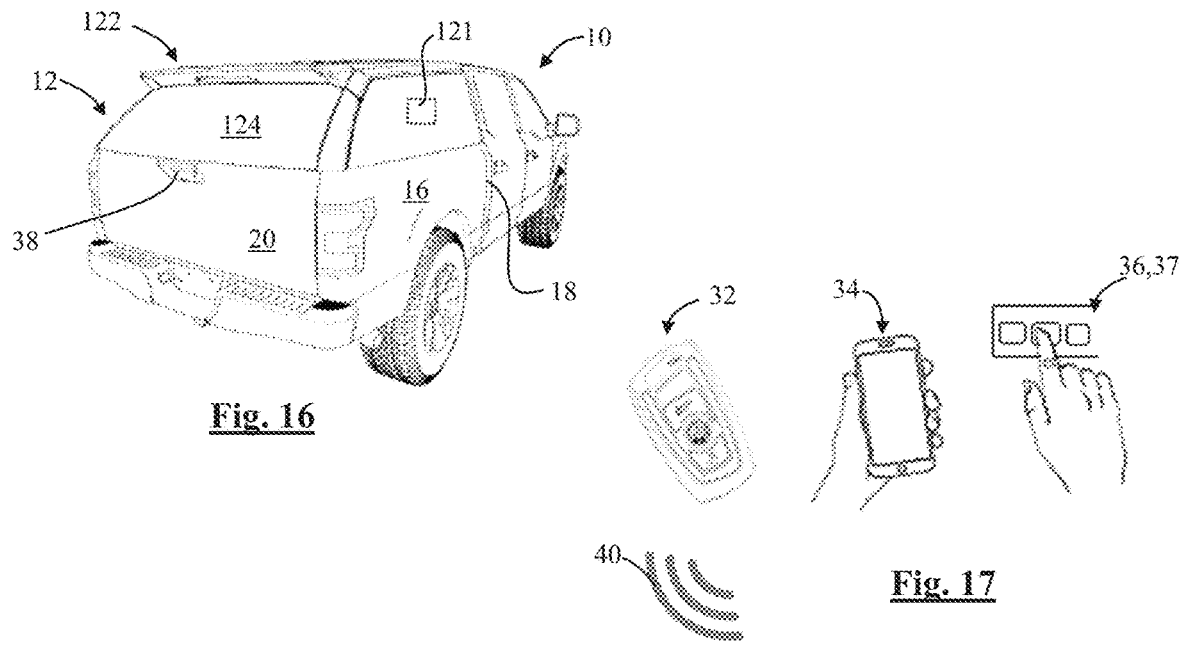
Fig. 16
Fig. 17
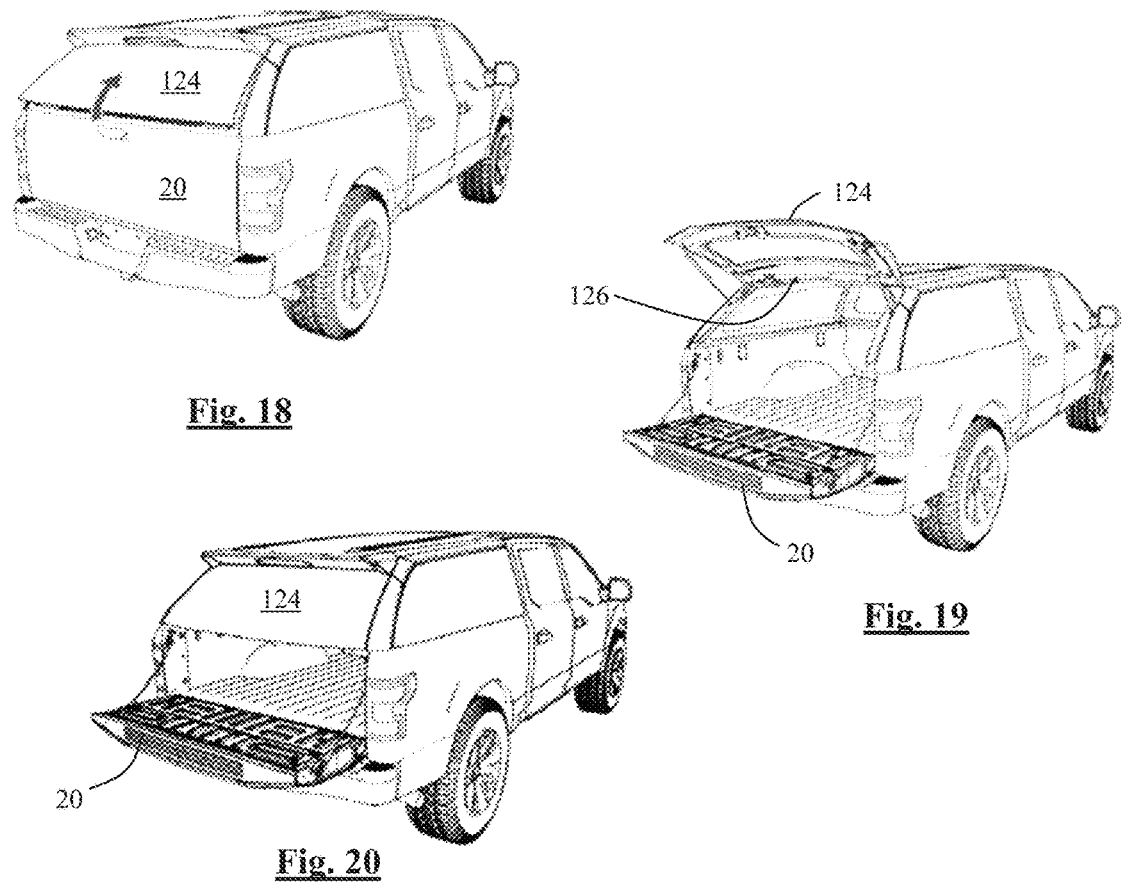
Fig. 18
Fig. 19
Fig. 20

INTEGRATED VEHICLE COVER

PRIORITY

This application claims the benefit of U.S. 63/024,585 filed May 14, 2020, the entirety of which is expressly incorporated by reference herein for all purposes.

FIELD

These teachings relate to a cover for a vehicle, and more particularly to tonneau covers and caps for vehicles.

BACKGROUND

Some vehicles, like pick-up trucks and utility vehicles, have an open-topped cargo area or bed that may be used for storing or transporting cargo. A cover, such as a tonneau cover or cap, may be placed over the cargo area. The cover or cap, or one or more panels thereof, may be opened to access the cargo and/or the inside of the cargo area. The cover or cap, or one or more panels thereof, may be closed to conceal the cargo from view and/or to prevent fluid and/or debris from entering the cargo area.

It may be desirable to improve the current state of the art by providing one or more of the covers described herein.

SUMMARY

These teachings provide various covers. The covers according to these teachings may be integrated with one or more vehicles. Integrated may mean that one or more signals, commands, instructions, and/or other information can be communicated to or between the cover, one or more components of the cover, the vehicle, one or more devices such as a computer, controller, processor, memory, remote or key FOB, mobile device or application, a vehicle control module associated with the vehicle, a vehicle control module associated with the cover, or a combination thereof. The one or more signals, commands, instructions, and/or other information may be provided to the vehicle, the cover, the one or more panels of the cover, the one or more control modules, or a combination thereof to move or perform one or more actions such as open, close, retract, extend, fold, and/or otherwise move the cover or the one or more panels thereof. The one or more panels may be one or more slats or panels of a tonneau cover and/or a liftgate of a cap.

The one or more signals, commands, instructions, and/or other information may be used by the vehicle control module and/or the cover control module to determine a position of the tailgate (i.e., is the tailgate open, closed, partially open, partially closed, etc.), to determine a position of the cover or the one or more panels thereof (i.e., is the cover open, closed, partially opened, partially closed, etc.), to communicate a position of the one or more panels or tailgate to a vehicle owner, operator, bystander, vehicle control module, and/or cover control module. The one or more signals, commands, instructions, and/or other information may be used to diagnose problems or maintenance issues with the vehicle or cover and/or to schedule maintenance with a dealer or shop. The one or more signals, commands, instructions, and/or other information may be used as a signal or command for performing another action, such as opening, closing, retracting, extending, or otherwise moving the one or more panels of the tonneau cover and/or cap.

The cover, the one or more panels, the vehicle and/or cover control module, or a combination thereof may include one or more of the following features, may be operable, configured, and/or programmed to perform one or more of the following steps or actions: unlatch when tailgate is triggered by fob, tailgate handle, phone app, in-dash button; a tailgate delay circuit—the control module may intercept signal triggers, check or operate the cover and/or one or more panels, then move/open/close tailgate; cover and/or one or more panels open fully or partially when tailgate is activated or moved; cover and/or one or more panels latches fully once tailgate is fully closed; vehicle and/or bed lights are turned on or off or blink before, during, or after cover and/or one or more panels are opened or closed; autotimer to turn on or turn off lights; smart phone or other device to control cover and/or one or more panels; Vehicle "chimes" or text alert if operator with fob walks out of range with cover opened—Available bypass; CHMSL, other lights, turn signals, camera, added to B-side of one or more panels, or to sides or A-side of one or more panels; camera turned on automatically when one or more panels are being folded or unfolded—video may project onto vehicle dash screen; auto close cover and/or one or more panels at certain vehicle speeds; auto close cover and/or one or more panels when key fob and/or smart phone is out of range of vehicle and/or control module; foot or hand activated sensor to unlatch cover and/or one or more panels; anti-pinch during opening and closing of cover and/or one or more panels; auto close via rain sensor.

The cover, the one or more panels, the vehicle and/or cover control module, or a combination thereof may include one or more of the following features: one or more illuminated open and/or close buttons; latch and/or unlatch buttons can be capacitive touch; battery life indicator (vehicle battery and/or cover battery; open cover warning light and/or sound; video recording—transmission to 3rd party or cloud for viewing/storage; power supply; phone charging option; phone holder.

A cover for a cargo area of a vehicle, comprising: one or more panels that are movable between a closed and open configuration, an optional control module for controlling the cover and/or the one or more panels. The control module is operable to move the one or more panels into an open configuration. The control module is operable to move the one or more panels into an open configuration before or during movement of a tailgate of the vehicle into a closed configuration. The control module is operable to move the one or more panels into a closed configuration during or after movement of a tailgate of the vehicle into a closed configuration. The control module is operable to move the one or more panels into a closed configuration after a transmission of the vehicle is moved into a different gear. The control module is operable to move the one or more panels into a closed configuration after precipitation is detected. The control module is operable to move the one or more panels into a closed configuration after a predetermined amount of time. The control module is operable to move the one or more panels into a closed configuration after a key fob is out of range of the control module. The one or more panels comprise a camera. The one or more panels comprise a camera to provide video of an inside of a cargo area of the vehicle and/or an area surrounding the cargo area. The one or more panels comprise one or more lights. The one or more panels comprise one or more lights that includes a brake light, a turn signal, a flood light, or a combination thereof. The cover is a tonneau cover. The cover is a bed cap. The cover is a folding cover. The cover is a roll-up cover.

BRIEF DESCRIPTION OF THE DRAWINGS

FIG. 1 is a perspective view of a vehicle and cover.

FIG. 2 is a side view of a portion of the vehicle and cover.

FIG. 3 shows schematic representations of various devices for communicating signals to or between the vehicle, cover, or both.

FIG. 4 is a side view of a portion of the vehicle and cover.

FIG. 5 is a perspective view of the vehicle and cover.

FIG. 16 is a perspective view of a vehicle and cover.

FIG. 17 shows schematic representations of various devices for communicating signals to or between the vehicle, cover, or both of FIG. 16.

FIG. 18 is a perspective view of the vehicle and cover of FIG. 16.

FIG. 19 is a perspective view of the vehicle and cover of FIG. 16.

FIG. 20 is a perspective view of the vehicle and cover of FIG. 16.

DETAILED DESCRIPTION

Figure 6A:
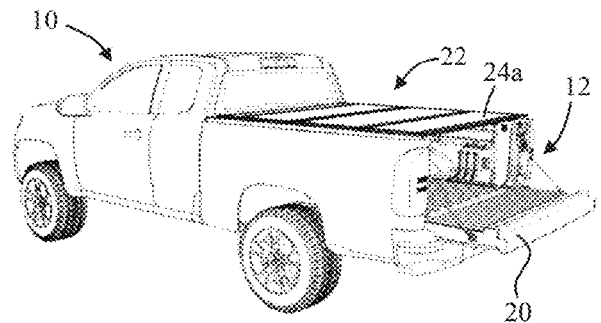
FIG. 6a is a perspective view of a vehicle and cover.

Various vehicles and covers are disclosed herein. One or more of the elements, features, components, structures, assemblies, methods, method steps, and/or members of the vehicle and/or cover disclosed herein may be added to, combined with, or removed from any cover or vehicle or method disclosed herein and/or currently available on the market. One or more of the elements, features, components, structures, assemblies, methods, method steps, and/or members disclosed herein may be duplicated, removed, separated, added, or combined with one or more other elements, features, components, structures, methods, method steps, and/or members disclosed herein, even though the combination, separation, duplication, and/or removal is not expressly disclosed herein. In other words, features from one type of vehicle or cover or method disclosed herein may be removed from, added to, combined with, and/or separated with or from one or more features of another vehicle and/or cover and/or method disclosed herein or available on the market.

These teachings provide a cover. The cover may be an apparatus for covering or concealing a portion of a vehicle, such as a cargo area. The cover may be a tonneau cover, topper, cap, tent, or a combination thereof. The cover may be attached, placed, supported, connected or rest on one or more top surfaces and/or one or more side surfaces of the one or more walls defining a cargo area. The cover may be attached, placed, supported, connected, or rest on one or more rails or supports that are attached or connected to one or more surfaces of one or more walls defining the cargo area. The cover or components thereof may be an aftermarket product that are attached to a vehicle by a vehicle owner. The cover or components thereof (e.g., the one or more panels, torsion elements, frames, frame members, hinges, etc.) may be assembled or integrated into the vehicle or cargo area by an OEM (Original Equipment Manufacturer).

One or more features or elements of any of the covers disclosed and/or illustrated herein may be provided on any cover, even though it is not illustrated or expressly disclosed herein. One or more features or elements of any of the covers disclosed and/or illustrated herein may be copied or duplicated. One or more features or elements of any of the covers disclosed and/or illustrated herein may be removed or eliminated. One or more features or elements of any of the covers disclosed and/or illustrated herein may be rearranged into other areas or positions relative to the vehicle depending on the specific construction of the vehicle and/or cargo area.

The vehicle may be virtually any vehicle. The vehicle may be any vehicle that has a cargo area or bed. The cargo area or bed may be any area or portion of a vehicle that may be used for storing and/or transporting goods, cargo, animals, people. The cargo area may be a cargo box, bed, trunk, storage compartment, or a combination thereof. The cargo area may be located in a front portion of a vehicle, a middle portion of a vehicle, and/or a rear portion of a vehicle. The cargo area may be located behind or adjacent a passenger area of a vehicle, where one or more passengers, occupants, and/or drivers may sit. A cargo area may be a trailer that is configured to be pulled, towed, or pushed by a vehicle. The cargo area may be any part of the vehicle that has an open top. The cargo area or open top can be at least partially closed or covered by a cover. The cargo area may be part of a pickup truck. The cargo area may be part of a utility task vehicle or utility terrain vehicle (UTV).

The cover may comprise one or more panels. A panel may be one or more parts, portions, components, or sections that at least partially cover or conceal any portion of the vehicle. The one or more panels may be moveable or can be moved or displaced relative to another part, portion, component or section of the cover, a vehicle, a cargo area, or a combination thereof. A panel may include any members located between two or more panels adjacent panels that does not move relative to one or more other panels or hinges, like a spacer bar. The one or more panels may be a rigid section of the cover, a flexible section of the cover, a frame, a frame member, a spacer, a hinge, or a combination thereof. A spacer may be a material, component, or member that is provided or located between or adjacent the one or more panels, hinges, frames, frame members, torsion elements, or a combination thereof. A spacer may be provided between a panel and the cargo area or walls thereof to assist with mounting the cover to the cargo area. A spacer may be provided to cover any gaps between the cover and cargo area. A spacer may be provided to add strength or rigidity to adjacent panels or hinges.

In some configurations, two or more panels may be defined in or within a single panel. For example, a single panel may be provided that includes one or more living hinges that divide or define the single panel into two or more panels. A living hinge may be a cutout, detent, notch, groove, channel, thinned-area, flexible material, or a combination thereof formed or added to a panel. Two or more of such panels with one or more living hinges may be combined to define the cover.

One panel may cover the entire cargo area of the vehicle. More than panel may cover an entire length of the cargo area. The one or more panels may be folded, tilted, or pivoted to move the cover between an open and closed configuration. The one or more panels may be folded in a direction of the front of the vehicle or the passenger area to move the cover into an open configuration and then folded towards a rear of the vehicle towards the tailgate to move the cover into the closed configuration, or vice versa.

The one or more panels may be folded, pivoted, rolled, or moved in a direction towards the rear of the vehicle or tailgate to move the cover into an open or at least partially open configuration. The one or more panels may be folded, pivoted, rolled, or moved in a direction towards the front of the vehicle or passenger area to move the cover into a closed or at least partially closed configuration.

The one or more panels may be folded, pivoted, rolled, or otherwise moved in one direction to open or at least partially open the cover and one or more other panels that are folded, pivoted, rolled, or otherwise moved in the opposite direction or even a different direction to open or at least partially open the cover. Such a cover may be a butterfly style cover. In the open position, this cover may have a "V" or "U" shape, for example, The one or more panels may be folded, pivoted, rolled or moved upwardly at, about, near, or towards a center or inner region of the cargo area of the vehicle and away from one or more of the side walls to move the cover into the open configuration and then folded back down or towards the side walls of the vehicle to move the cover in the closed configuration. Such a cover may be a gullwing style cover.

The one or more panels may be one or more slats or members that can be rolled up in a direction of the passenger area to move the cover into an open configuration and then unrolled towards the tailgate to move the cover into the closed configuration, or vice versa. The one or more slats or members can be rolled and unrolled towards a center region of the cargo area and/or towards one or more of the side walls of the cargo area, like side walls 16a, 16b.

The one or more panels may be separate or discrete pieces that are joined together with one or more hinges, spacers, torsion elements, frames, frame members, or other panels.

The one or more panels may be made of a suitable material, such as plastic, metal, foam, composite, wood, fiberglass, or a combination thereof. The one or more panels may be substantially rigid, soft, or flexible, bendable, resilient, or a combination thereof. The one or more panels may comprise a core that is covered in a skin. The core may be a plastic material such as extruded polypropylene or foam. The skin may be a sheet or spray that covers the core. The skin may be TPU, TPV, TPE, and/or TPR. The one or more panels may be made of the same or similar material as the cargo area or fenders so that the cover and the cargo area and vehicle have a uniform appearance. The one or more panels may be made of a single material or may be formed of multiple materials or components that are assembled together. The one or more panels may include one or more frames or frame members that provide strength and rigidity to the panels. The one or more hinges, torsion elements, spacers, frames, frame elements, or a combination thereof may be part of the panel or separate members.

The one or more of the panels can be moved or repositioned relative to one another and/or relative to the cargo area or vehicle to move the cover or one or more panels thereof between a closed configuration and an open configuration.

A closed configuration as used herein, means that the one or more panels are arranged to conceal at least partially, block, hide, restrict, or otherwise prevent sight, access, and/or entry to an inside of the cargo box. In the closed configuration, the one or more panels may be arranged to protect against dirt, debris, fluid, sunlight, and/or other contaminants or items from entering an inside of a cargo area. In the closed configuration, one or more of the panels may be in a generally horizontal position. In the closed configuration, one or more of the panels may be free from being stacked or folded on top of another one or more panels. The closed configuration may refer to one or more panels being in a closed configuration or to the entire cover assembly being in the closed configuration. In other words, one of the panels may be in the closed configuration (for example, a panel that is located near or adjacent to the passenger area, while another panel (for example one that tis located rearward of the closed panel, closer to the tailgate) is in the open configuration.

An open configuration as used herein, means that the one or more panels are arranged to at least partially provide access or entry to or into the cargo area or an inside thereof. In the open configuration, one or more of the panels may be moved or repositioned from the closed configuration to provide sight and/or access to an inside of the cargo box. In the open configuration, one or more of the panels may be in any non-horizontal position. In the open configuration, one or more of the panels may be in a generally horizontal position but may be stacked or folded on top of one or more other panels. The open configuration may refer to one or more panels being in an open configuration or to the entire cover assembly being in the open configuration. In other words, one of the panels may be in the closed configuration (for example, a panel that is located near or adjacent to the passenger area, while another panel (for example one that tis located rearward of the closed panel, closer to the tailgate) is in the open configuration.

The one or more panels may be moved from a closed configuration to an open configuration and vice versa by moving, repositioning, or otherwise changing a position of one or more panels relative to one or more other panels, the cargo box, the vehicle, one or more hinges, or a combination thereof. For example, a position of one or more of the panels can be changed by moving, pivoting, folding, swinging, rolling, collapsing, winding or otherwise turning or flipping one or more panels over or onto another one or more panels about one or more hinges, frames, panels, torsion elements, or a combination thereof.

The cover and/or the one or more panels may be an assembly comprised of one or more frames or frame members, one or more hinges, one or more torsion elements, one or more spacers, or a combination thereof.

The cover and/or the one or more panels may include one or more lights. The one or more lights may be used for decoration and/or function. The one or more lights may include turn signal lights, brake lights, and/or taillights. The one or more lights may be flood lights to illuminate the inside of the cargo area, an area behind the cargo area, an area to one or both sides of the vehicle, or a combination thereof. The one or more lights may blink, flash, or turn on before, during, or after the one or more panels are moved. The one or more lights may blink, flash, turn on, or turn off after the cover or one or more panels are locked or unlocked. The one or more lights may blink, flash, turn on if the anti-pinch mechanism is activated and an object is interfering with opening or closing the one or more panels or cover. The one or more lights may have different colors. The one or more lights may be LED, halogen, fluorescent, neon, high intensity lights.

The vehicle and/or the cover may include one or more control modules (also referred to herein as control module, a cover control module, vehicle control module, or a combination thereof). A control module may be or may include one or more controllers, computers, processors, and/or memory. The control module may be used for integrating the cover with the vehicle. The control module may perform one or more actions in response to one or more signals directed by a user. The control module may be programmed to accept one or more signals from an operator to move the cover, the one or more panels of the cover, the tailgate, a liftgate, or a combination thereof. The control module may check a status or position of the tailgate, the cover, the liftgate, the one or more panels, or a combination thereof. The control module may be programmed to generate, deliver, or provide one or more types of feedback in response to a signal from an operator. The control module may be programmed to provide one or more types of feedback in response to a fault if problems occur with the cover, the tailgate, the one or more panels, the liftgate, or a combination thereof. The feedback may be instantaneous (i.e., audible, and/or visual signals) or the feedback may be delivered later in time, such as in a daily, weekly, and/or monthly summary report. The control module may be configured to perform one or more operations in response to an event occurring or lack of an event occurring. For example, if the tailgate and/or cover is detected in an open position, and it begins to rain or snow, or if there is a forecast of precipitation, or it is past a certain time (for example, past sunset), but control module may be configured to cause the tailgate and/or cover to close by turning ON, activating, or manipulating one or more actuators. The control module may be configured to generate and send one or more alerts if a tailgate or cover is opened during certain hours, for example, after sun set and before sun rise. The cover and/or control module may include an alarm system that may be activated if the cover or one or more panels are moved into an at least partially open position without presence of a key or fob or other remote or mobile device. The alarm system may be part of the vehicle alarm system. The cover may have its own alarm system that is not part of the vehicle or the vehicle alarm system. The control module may be configured to detect or determine the position of the cover (tonneau or cap). For exampe, the control module may be configured to detect or determine if the cover is in a closed or open position. The control module may monitor a position of one or more motors or actuators or mechanisms associated with moving the tonneau cover to determine if the cover is in the closed or open position. For example, the control module may monitor an angular position of one or more motors to determine a position of the cover, linear position of an actuator, use a touch or proximity sensor to determine if the cover is in contact with the tailgate or in the closed or open position, a light sensor, a load or pressure sensor, or the like. The control module may be one or more control modules. The control module may be the vehicle control module that is provided by the OEM vehicle manufacturer. The control module may be a cover control module that is provided by the cover supplier. The control module may be an integrated cover and vehicle controller.

The control module may be electrically connected to the internet. The control module may provide WIFI or hot spot access to users in close proximity to the vehicle or cover.

The control module may provide others with temporary access to the vehicle, cargo area, or both, for at least a predetermined amount of time. For example, a delivery person may gain access to an inside of the cargo area by opening the cover, the one or more panels, the lift gate, the tailgate, or a combination thereof to drop off or pick up goods or packages. The delivery person may be able to move the cover, liftgate, or tailgate into an open configuration to access the cargo area by way of a proximity sensor, by inputting a code into a keypad on a keychain, keypad on the cover or vehicle, or via a mobile phone.

The control module may be located in the cover, the one or more panels, the vehicle, the cargo area, the cloud, or a combination thereof. The control module may be installed in the vehicle by the OEM manufacturing location. The control module may be installed in the vehicle as an after-market product by a vehicle owner or agent of the vehicle owner. The control module may be located in one or more black boxes, and contained in the cover, panels, cargo area, vehicle, key FOB, mirrors, controller, passenger area, or a combination thereof. The control module may be programmed by the OEM or the retailer of the cover or control module. The control module may be reprogrammed and/or updated to address software or hardware faults and/or upgrades. The control module may be part of a mobile device, computer, or both. The control module may be part of wearable technology, such as a wristwatch or other device, so that a user can control the cover, one or more panels, and/or receive/send one or more signals to or from the cover and their remote. The control module may be provided on a desktop computer or central service so that one or more owners or observers can monitor operation of the cover. This may be advantageous for companies and/or dealerships who may want to monitor the vehicle and use thereof.

The cover, the control module, or both may have provisions to control movement of the cover and/or the one or more panels by capacitive touch. This means that the vehicle, the cover, the one or more panels, or a combination thereof may include a touch pad or keypad. If a user is equipped with a programmed smart phone, key fob or other remote and the user contacts the touch pad or keypad, the one or more panels or cover may move into an at least partially open configuration and/or an at least partially closed configuration. On the other hand, if the user does not have on their person or close proximity to them the programmed smart phone, key fob or other remote and they touch the touch pad or keypad, the one or more panels or cover will preferably not move into an at least partially open configuration and/or an at least partially closed configuration. In some configurations, the touch pad or keypad may be hidden and only present itself (i.e., move from a concealed area or illuminate itself), if a user is near the touch pad or keypad and has the programmed smart phone, key fob or other remote on their person or close to them. When the touch or keypad is activated by the user, the signal may be sent to the control module (vehicle and/or cover control module), which may first check or determine a position of the cover and/or the one or more panels of liftgate thereof. The one or more panels or liftgate may need to be moved into an open position before the tailgate is raised or lowered, as disclosed herein.

The cover, the control module, or both may have provisions to control movement of the cover and/or the one or more panels by a hands-free function, such as a foot sensor operation. This means that the vehicle, the cover, the one or more panels, or a combination thereof may include one or more cameras, proximity sensors, light curtains, etc. If a user is equipped with a programmed smart phone, key fob or other remote and the user enters an area, the one or more panels or cover may move into an at least partially open configuration and/or an at least partially closed configuration.

The vehicle, the cover, or both may include one or more mechanisms or apparatuses. The one or more mechanisms or apparatuses may be configured to cause to move the one or more panels, the cover, the liftgate, the tailgate. The one or more mechanisms or apparatuses may be configured to move the one or more panels, the cover, the liftgate, the tailgate in response to a signal provided by an operator, the control module, or both. The one or more mechanisms or apparatuses may be configured to move the one or more panels, the cover, the liftgate, the tailgate in response to an event occurring, such as the key fob not being detected, rain or precipitation occurring, objects in the way of closing the cover, etc. The one or more mechanisms or apparatuses may be one or more motors, cylinders, pistons, shocks, springs, rotary to linear actuators, hinges, torsion elements or springs, or a combination thereof. The one or more mechanisms or apparatuses may be powered by one or more of the vehicle batteries, one or more solar panels, one or more batters that are part of the cover, or a combination thereof. The one or more solar panels may be incorporated into the vehicle, cover, panels, or a combination thereof. The one or more mechanisms or apparatuses may be configured to be overridden by an operator for manual movement or operation of the cover, panels, cap, or liftgate by a user. The one or more mechanisms for moving the one or more panels, cover, liftgate, etc. may be contained within or attached to the cover, the one or more panels, the vehicle, the one or more walls defining the cargo area, or a combination thereof. The one or more mechanism may receive one or more signals from the control module(s) to begin, cease, or continue movement of the one or more panels, liftgates, covers, or caps. The one or more mechanisms may include one or more control modules that communicate with the vehicle and/or cover control module to send signals representative of the position of the one or more mechanism for the control module to determine if the cover, panel, or liftgate is in a closed, open, or in between position.

An exemplary vehicle 10 is shown in FIGS. 1 and 5. The vehicle 10 comprises a cargo area 12 and a passenger cab 14. The cargo area 12 is surrounded or defined by a plurality of walls that include: opposing side walls 16*a*, 16*b*, a front wall 18 that is located adjacent to the passenger cab 14, and a rear wall or tailgate 20 that opposes the front wall 18. The front wall 18 of the cargo area 12 may be a shared or common wall with a back wall of the passenger cab 14 or may be a separate wall juxtaposed thereto. The vehicle may be a one-piece body or a uni-body construction. In some vehicle configurations, the front wall 18 may be a separate wall, segment, or portion of the vehicle from a wall of the passenger cab 14. The front wall 18 may be moveable to provide a pass through or access between the cargo area 12 and passenger cab 14. The cargo area 12 or tailgate 20 may comprise a latch 38 for manually moving the tailgate 20 between a raised or closed configuration (FIG. 1) and a lowered or open configuration (FIG. 5).

A cover 22 may be located or placed over an open end of the cargo area 12. The cover 22 may be any of the covers disclosed herein. The cover 22 may include one or more of any of the features disclosed herein. The cover 22 may include one or more panels. In FIG. 1, the cover 22 includes three panels 24*a*, 24*b*, 24*c*. However, the cover 22 may include any number of panels, including as little as only one panel (i.e., the cover 22 may include no more than one panel). For purposes of describing orientation, panel 24*a* may be referred to as the first or rear panel and panel 24*c* may be referred to as the third or front panel. The panels may be separated from one another by hinges 26*a*, 26*b* that allow or enable the one or more of the panels to move, pivot, or fold relative to other panels and/or the cargo area 12. Hinges as used throughout this disclosure may include a single hinge, or an arrangement or series of a plurality of adjacent hinges. A hinge may include one or more spacers or spacer bars. A spacer or spacer bar may provide added strength or rigidity for attaching a hinge to a panel and/or may provide additional spacing between adjacent panels. One or more of the hinges may be a living hinge. The cover 22 and panels 24*a*, 24*b*, 24*c* are shown in a closed configuration in FIGS. 1 and 2, where the panels and cover 22 substantially cover the open or top side of the cargo area 12. The cover 22 and panel 24*a* is shown in an open configuration or at least partially open configuration (or an at least partially closed configuration) in FIGS. 4 and 5.

The vehicle 10 and/or the cover 22 may include one or more control modules 21. The control module 21 may be a cover control module, a vehicle control module, or both a cover and vehicle control module. This means that the control module 21 may be the actual vehicle controller or computer (ECM, ECU, etc.) This means that the control module 21 may be an independent controller or computer that communicates with the vehicle controller or computer (ECM, ECU, BCM, etc.). For example, the control module 21 may be connected to the vehicle controller or computer via the CAN BUS, OBD port, Bluetooth, etc. The control module 21 may be the vehicle controller or computer that also includes a program for running or operating the cover 22. For example, software and/or hardware may be added to the OEM vehicle controller or computer (ECM, ECU, BCM, etc.) to allow controlling of the cover.

The cover 22 and/or control module 21 may be integrated, connected, or electrically connected to or with the vehicle 10. The cover 22 and/or control module 21 may be integrated, connected, or electrically connected to or with the vehicle 10 by the vehicle OEM or installed as an aftermarket application or product. Integrated, connected, or electrically connected means that power, electrical power, signals, information, commands, and/or other information may be transmitted or communicated to and/or between: the vehicle 10; the cover 22; one or more panels of the cover 22; one or more vehicle and/or cover control modules 21; one or more computers, processors, sensors, memory; one or more remotes or transmitters; one or more mobile devices or apps running on the module device; one or more mechanisms, key FOBS, keypads, and/or actuators that are part of the vehicle 10 and/or cover 22 and configured to move the cover 22; one or more panels of the cover 22; one or more vehicle batteries and/or vehicle solar panels; the vehicle motor or engine; the tailgate 20; one or more GPS units or communication devices, one or more internet programs, one or more side walls of the cargo area; or a combination thereof. The cover 22 and/or cover control module 21 may be integrated or connected to or with the vehicle BUS. The cover 22 and/or control module 21, computers, processors, sensors, memory, or a combination thereof may be at least partially contained within the cover 22, the vehicle 10, cargo area 12, or a combination thereof. The control module 21 may be the actual vehicle computer or electronic control unit (ECU) or body control module (BCM). The control module 21 may be connected to the vehicle computer, ECU, BCM, by connecting the control module 21 to a vehicle on-board diagnostics port (i.e., OBD, OBD-I, OBD-II, or the like). The control module 21 may be connected to the vehicle computer, ECU, BCM, by connecting the control module 21 to one or more other controllers, actuators, wires, computers that are ultimately in communication with the vehicle computer, ECU, and/or BCM. For example, the one control module 21 may be electrically connected to one or more wires or actuators that are used to move, control, or power the tailgate of the vehicle. The control module 21 may function to intercept or use one or more signals provided to a vehicle door or tailgate by the vehicle control module to in turn control the tonneau cover, cap, or one or more panels thereof.

One or more software, programs, and/or sequences can be ran or executed by the vehicle, cover, cover control module, computer, processor. The one or more programs, software, and/or sequences may be contained within the cover 22, the control module 21, programmed into the vehicle computer or cover control module 21, and/or may be stored in the cloud or remote server. The cover 22 and/or control module 21 may be integrated with, connected, or electrically connected to the vehicle via a vehicle diagnostic port (i.e., a plug and play application). The cover 22 and/or control module 21 may be integrated with, connected, or electrically connected to the vehicle 10 by hard wire. The cover 22 and/or control module 21 may be integrated with, connected, or electrically connected to the vehicle 10 via Wi-Fi, Bluetooth®, RF, near field, cellular, or other communication mechanisms or means. The cover 22 and/or control module 21 may be connected to the vehicle by a contact-less connection, such as FIELDSENSE technology, where direct contact with the vehicle or OEM hardware is not required. Instead, one or more transmitters or harnesses can be placed near the vehicle or OEM computer or controller and an electrical connection may be made. This may be advantageous for after-market installations and installations that may not void vehicle warranty. Software on the control module 21 may be uploaded, updated, and/or exchanged via a wireless or wired communication signal.

Any of the examples given herein apply to all examples in this disclosure. For example, any reference made to a feature in FIG. 1 may be applied to FIG. 9, FIG. 16, etc., and vice versa.

FIG. 2 is a side view of a rear portion of the vehicle 10 and the rear panel 24a of the cover 22. The rear panel 24a is illustrated in a closed configuration, where at least a portion of the rear panel 24a is in contact with the tailgate 20 (i.e., rear panel 24a is resting on and/or against the tailgate 20) such that if the tailgate 20 were moved, lowered, or opened, the tailgate 20 would crash into or contact the rear panel 24a or cover 22. In other words, if the tailgate 20 were opened or lowered from the illustrated FIG. 2 configuration, the tailgate 20 and/or the rear panel 24a may be damaged or scratched. In some configurations, the closed configuration may be where the rear panel 24a is in close proximity to but not in direct contact with the tailgate 20 such that if the tailgate 20 were moved, lowered, or opened, the tailgate 20 would still crash into or contact the rear panel 24a or cover 22. In some configurations, the closed configuration may be when the rear panel 24a or cover 22 at least partially overhangs at least a portion of the tailgate 20 such that if the tailgate 20 were moved, lowered, or opened, the tailgate 20 would crash into or contact the rear panel 24a or cover 22. Such contact or close proximity between the rear panel 24a and the tailgate 20 may be preferred to conceal contents within the bed and/or to prevent dust, debris, and/or fluid from entering the cargo area.

While the tailgate 20 may be opened or lowered from its closed configured illustrated in FIGS. 1, 2 to the open configuration illustrated in FIG. 5, doing so with at least the cover 22 and/or the rear panel 24a in their closed configuration may cause damage to the tailgate 20, the rear panel 24a, the cover 22, or a combination thereof. For example, when the tailgate 20 and the rear panel 24a or cover 22 are both in the closed configuration, a bottom surface 28 of the rear panel 24a or cover 22 may be in contact with a top surface 30 of the tailgate 20. This contact may be intentional and/or desirable to restrict or prevent debris, fluid, or other items from entering the cargo area 12, to restrict or prevent access into the cargo area 12, to restrict or prevent items from exiting the cargo area 12, and/or to lock the cover 22 to the cargo area 12 or vehicle. However, by opening or lowering the tailgate 20 while the rear panel 24a is in contact the tailgate 20, the top surface 30 of the tailgate 20 may become scratched or damaged, a bottom surface 28 of the rear panel 24a may become scratched or damaged, or the overall cover 22 may be damaged. Accordingly, it may be preferable to at least partially open or raise or move the cover 22 or the rear panel 24a out of the closed configuration before the tailgate 20 is opened or lowered.

Referring now to FIGS. 3 and 4, a vehicle owner or operator who desires to open or lower the tailgate 20 may do so by generating one or more signals, commands, or instructions 40. The one or more signals 40 may be generated by depressing or actuating one or more buttons on a key fob or remote control 32; by using a mobile device or app 34; by activating one or more buttons 36 on a key pad 37 that is located inside or outside of the vehicle 10, or on the cover 22 or one or more panels thereof; by using voice or touch commands; by actuating the tailgate latch 38; by using a remote proximity sensor (i.e., hand and/or foot sensor) that is configured to detect presence of a user with a remote application, key FOB, or other authentication. For example, the one or more buttons or keypad 37 may be located on a bed cap attached to one or more walls or tailgate defining the cargo area, on the one or more panels, on a pillar of the cab of the vehicle, attached to an inside of the bed wall, or a combination thereof. The one or more signals 40 may be generated and then transmitted to the vehicle 10, tailgate 20, the vehicle and/or cover control module 21, cover 22, computer, processor, and/or one or more mechanisms that may function to at least partially move, open, pivot, and/or pop the one or more panels or cover 22 or tailgate 20 into an open configuration. For example, the one or more panels or cover 22 may be moved out of contact with the tailgate. For example, the one or more panels or cover 22 may be moved to exert less force on the tailgate but still in contact with the tailgate. For example, the one or more mechanisms may be one or more actuators, piston and cylinders, gas shocks or springs, motors, linkages, cables, magnets, linear actuators, air shocks or cylinders, compressors, electromechanical devices, or the like. For example, a mechanism for moving the cover 20 and/or panel may be the type disclosed in commonly owned application U.S. 62/990,169 filed Mar. 16, 2020 and/or U.S. Ser. No. 16/953,839 filed Nov. 20, 2020, the entire contents of which are hereby incorporated by reference herein for all purposes.

The vehicle and/or cover control module 21, computer, processor, and/or to one or more mechanisms that receives the transmitted signal or instruction 40 may first check for a position of the tailgate 20, the cover 22 and/or rear panel 24a before moving the tailgate 20. If the cover 22 and/or rear panel 24a is already in an at least partially open configuration, then the tailgate 20 may be moved or lowered into the desired open configuration according to the signal or instruction 40. The tailgate 20 may be moved or lowered into the open configuration manually or automatically with one or more mechanisms (i.e., actuators, piston and cylinders, shocks or springs, linear actuators, motors, cables, or a combination thereof).

If after checking a position of the one or more panels or cover, the computer, processor, cover and/or vehicle control module, and/or the one or more mechanisms determine that the rear panel 24a or the cover 22 is in the closed configuration or at least partially closed configuration or position, then the one or more mechanisms may first cause or may first move, raise, roll back, or pivot at least the rear panel 24a and/or cover 22 into an at least partially open configuration, as shown in FIG. 4. After the cover 22 or rear panel 24a is in the at least partially open configuration, then the tailgate 20 may be moved or lowered into the desired open configuration, as shown in FIG. 5, without interfering, crashing into, or otherwise causing damage to the tailgate 20, the rear panel 24a, the cover 22, or a combination thereof. For example, the cover 22 or rear panel 24a may be moved one or more inches above or out of contact with the tailgate.

After the tailgate 20 has been lowered or moved into the open configuration, or while the tailgate 20 is being lowered or moved into the open configuration, the rear panel 24a or cover 22 may move back down into the lowered or closed configuration. Alternatively, after the tailgate 20 has been lowered or moved into the open configuration, or while the tailgate 20 is being lowered, one or more of the panels or the rest of the cover 22 may be moved into a fully open configuration.

Before, during, and/or after the cover 22, the one or more panels of the cover 22, and/or the tailgate 20 are moved into, from, or between the open and closed configurations, the vehicle and/or cover control module 21 may cause one or more visual lights and/or audible sounds or signals to emit or turn ON to notify a user, operator, or bystander that the tailgate 20 and/or cover 22 are moving or will soon be moved. This may be a safety feature to provide warning of the upcoming moving parts. After the cover 22, the one or more panels, and/or the tailgate 20 are moved into the desired position, the vehicle and/or cover control module 21 may cause one or more visual lights and/or audible sounds or signals to emit to notify a user or operator that the operation or movement of the parts is complete. The one or more lights or sounds may emit from one or more devices provided on the cover 22, the one or more panels, on the vehicle 10, inside of the passenger area 14, the cargo area 12 or side walls thereof, on the remote or key fob, on the mobile device or app, or a combination thereof. The sound may be emitted from the vehicle horn and/or speakers.

In FIG. 6a, the vehicle 10 is shown with its tailgate 20 in an opened or lowered configuration and the cover 22 is in a closed configuration. If the tailgate 20 were to be moved or raised into the raised or closed configuration with the cover 22 in the closed configuration, the tailgate 20 may crash into the rear panel 24a or cover 22, which may undesirably damage or scratch the tailgate 20 and/or cover 22.

Accordingly, briefly referring back to FIG. 3, a vehicle owner or operator who desires to raise or close the tailgate 20 may do so by generating and/or transmitting one or more signals 40 with the key fob or remote control 32; the mobile device or app 34; the one or more buttons 36 on the one or more keypads 37 located inside or outside of the vehicle 10, or on the cover 22 or one or more panels thereof; using voice or touch commands; via one or more proximity sensors or controls (i.e., foot or hand sensors); and/or actuating the tailgate latch 38. The one or more signals and/or commands 40 may be generated and then transmitted to the vehicle 10, tailgate 20, cover 22, vehicle and/or cover control module 21, computer, processor, and/or one or more mechanisms that may function to check a position of the one or more panels or cover 22. If the one or more panels or cover are in a closed position like in FIG. 6a, the vehicle and/or cover control module may cause the one or more panels or cover 22 to move, open, roll, retract, or pivot into an open configuration for example as illustrated in FIG. 6a and/or FIG. 8. After the panels or cover 22 are moved or while the panels or cover 22 are moved, the tailgate 20 may be raised into the closed configuration according to the arrow in FIG. 8, without crashing into or causing damage to the cover 22, the rear panel 24a, the tailgate 20 or a combination thereof. After the tailgate 20 is in the closed configuration, or before the tailgate 20 is in a fully closed position and/or is still moving into the closed configuration, the cover 22 or rear panel 24 may be moved back down in its closed configuration. As discussed above, one or more audible and/or visual signals may be generated by the vehicle 10, cover control module 21, and/or cover 22 before, during, or after movement of the cover 22, panel 24a, and/or tailgate 20.

Figure 8:
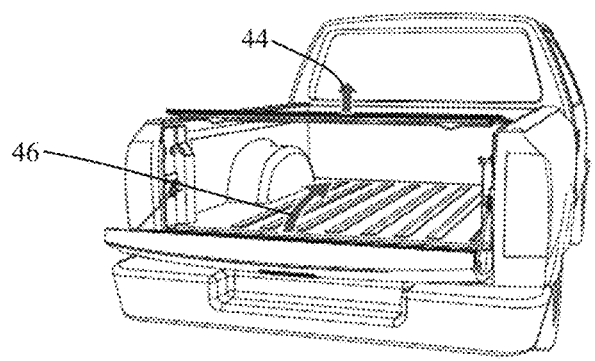
FIG. 8 is a perspective view of the vehicle and cover.

On the other hand, if a position of the one or more panels or cover 22 was determined to already be in an open position after the one or more signals and/or commands 40 are generated and then transmitted to the vehicle 10, tailgate 20, cover 22, vehicle and/or cover control module 21, computer, processor, and/or one or more mechanisms, then the tailgate 20 may be raised into the closed configuration according to the arrow in FIG. 8, without crashing into or causing damage to the cover 22, the rear panel 24a, the tailgate 20 or a combination thereof.

Figure 7:
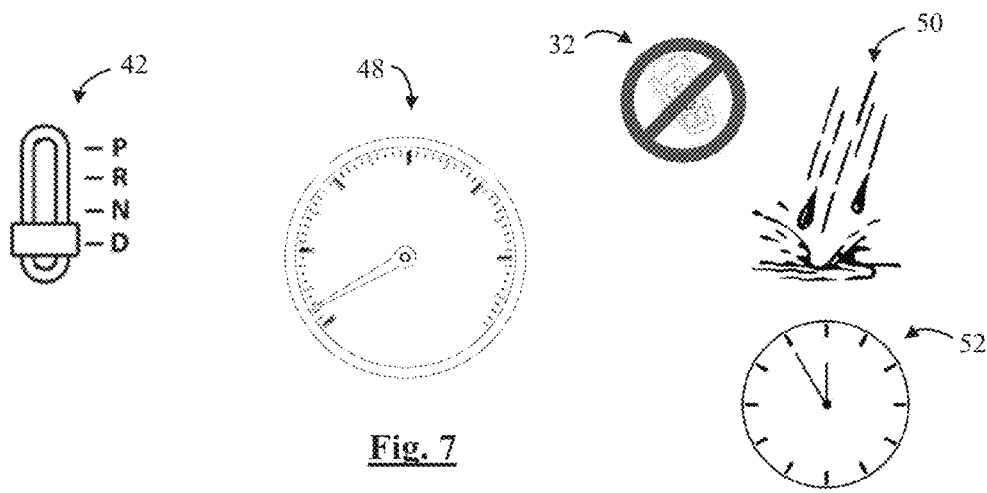
FIG. 7 shows schematic representations of various prompts that may activate closure of the cover and/or tailgate.

Referring now to FIGS. 6a and 7, if or after the vehicle transmission is put into a particular gear, for example, shifted from park to reverse, or neutral, or drive, or any combination thereof, the vehicle 10, cover 22, cover control module 21, vehicle control module, computer, processor, or a combination thereof may check the position of the tailgate 20 and/or cover 22 and/or panel thereof. If the tailgate 20 is in an open configuration, a signal (audible and/or visual) may be communicated to the vehicle 10, cover 22, remote, FOB, mobile phone, or operator of the vehicle 20 to notify them of the open tailgate 20. A signal or instruction may be communicated to a computer, processor, the vehicle 10, the cover 22, cover control module 21, vehicle control module, and/or a mechanism to move the cover 22 or at least the rear panel 24a into an at least partially open configuration (See arrow 44 FIG. 8) before or while the tailgate 20 is automatically moved or raised into a closed configuration (See arrow 46 FIG. 8). The cover 22 and/or control module 21 may rely on an anti-pinch apparatus similar to the one described below at FIG. 14 to prevent damage to the cover 22, panel, tailgate 20, and/or object that may be in the cargo area due to movement or closing of the tailgate 20. After or before the tailgate 20 is in the closed configuration, the cover and/or vehicle control module may check to determine the position of the cover and/or panel. If the cover and/or panel is in an open position, the cover and/or vehicle control module may cause the cover 22 or rear panel 24*a* to be moved into the closed configuration.

After the vehicle transmission is put into a particular gear, for example, shifted from park to reverse, or neutral, or drive, or any combination thereof, the vehicle 10, cover 22, cover control module 21, computer, processor, or a combination thereof may check for a position of the cover 22. Additionally, or alternatively, before there is any movement at all of the vehicle 10, the cover 22, and/or the panels, the cover control module 21, computer, processor, or a combination thereof may check for a position of the cover 22 or one or more panels thereof, regardless of if the vehicle transmission is changed from one gear or position to another. This may occur when the vehicle is initially turned on or when the vehicle accessory is turned on, for example. In another configuration, a global positioning sensor (GPS) or other sensor such as an accelerometer may determine or assist in determining movement of the vehicle. Regardless of how vehicle movement is detected or observed, if movement of the vehicle occurs and if the cover 22 is determined to be in an open configuration, a signal (audible sound or noise and/or visual light or graphic) may be communicated to the vehicle 10, cover 22, or operator of the vehicle 20 to notify them of the open cover 22. A signal may be communicated to a computer, processor, the vehicle 10, the cover 22, cover control module 21, and/or a mechanism to automatically move the cover 22 or at least the rear panel 24*a* into an at least partially closed configuration or a fully closed configuration. The cover 22 and/or control module 21 may rely on an anti-pinch apparatus 23 described below at FIG. 14 to prevent damage to the cover 22, panel, and/or object that may be in the cargo area due to movement or closing of the cover 22. In other configurations, if movement of the vehicle 10 is detected or observed and if the cover 22 is in a closed configuration, a signal (audible and/or visual) may be communicated to the vehicle 10, cover 22, or operator of the vehicle 20 to notify and confirm the closed position of the cover 22.

The vehicle 10, the cargo area 12, the cover 22, the one or more panels, etc. may include one or more switches. A switch may sense if the cover or one or more panels are in a closed position, a partially closed position, an open position, or a partially open position. The one or more switches may be mounted to one or more walls of the cargo area 12, cover 22, one or more panels, one or more hinges, the latch, etc. and may be electrically connected to the vehicle 10, vehicle control module 21, or another computer or processor. The one or more switches may communicate or send one or more signals to the vehicle 10, vehicle control module 21, cover control module, or other computer or processor with information on whether the cover or one or more panels are in a closed position, a partially closed position, an open position, or a partially open position.

If during, or after the vehicle 10 exceeds a predetermined speed 48 while the tailgate 20 is in the open configuration, a signal may be communicated to the vehicle 10, cover 22, cover control module 21, vehicle control module, or operator of the vehicle 20 to notify them of the open tailgate. The cover and/or vehicle control module may check a position of the cover and/or panel. If the cover and/or panel is determined to be in a closed position, one or more signals may be communicated to a computer, processor, the vehicle 10, the cover 22, cover control module 21, vehicle control module, and/or a mechanism to automatically move the cover 22 or at least the rear panel 24*a* into an open configuration (See arrow 44 FIG. 8) before or while the tailgate 20 is moved or raised into a closed configuration (See arrow 46 FIG. 8). After the tailgate 20 is in the closed configuration, or when the tailgate 20 is in a sufficiently raised position to prevent a collision between the tailgate 20 and the rear panel 24*a* or cover, the cover 22 or rear panel 24*a* may be moved into the closed configuration.

If the vehicle remote or key fob 32 or mobile device is out of range from the vehicle 10, cover 22, cover control module 21, for a predetermined amount of time, if rain, show, or other precipitation is sensed by the vehicle 10 or sensor provided on the cover 22 or even possibly forecasted, and/or if a predetermined amount of time 52 has elapsed during which the tailgate 20 is in the open configuration, a signal may be communicated to the vehicle 10, cover 22, cover control module 21, mobile device, or operator of the vehicle 20 to notify them of the open cover 22. The position of the cover and/or panel thereof may be checked. If the cover and/or one or more panels is in an open position, a signal may be communicated by the cover and/or vehicle control module to a computer, processor, the vehicle 10, the cover 22 cover control module 21, vehicle control module, and/or a mechanism to automatically move the cover 22 or at least the rear panel 24*a* into an open configuration (See arrow 44 FIG. 8) before or while the tailgate 20 is moved or raised into a closed configuration (See arrow 46 FIG. 8). After the tailgate 20 is in the closed configuration, or when the tailgate 20 is in a sufficiently raised position to prevent a collision between the tailgate 20 and the rear panel 24*a* or cover, the cover 22 or rear panel 24*a* may then be moved into the closed configuration.

Figure 6B:
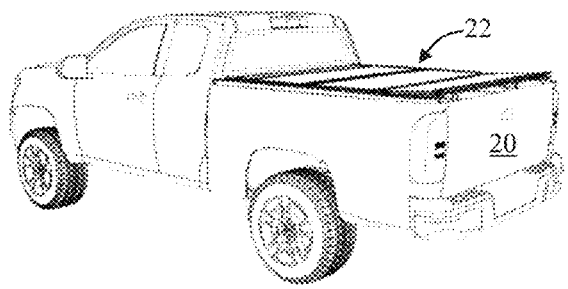
FIG. 6b is a perspective view of a vehicle and cover.

In FIG. 6*b*, a vehicle 10 is shown with its tailgate 20 in a closed or raised configuration, and the cover 22 is shown in a partially open configuration (or a partially closed position). With additional reference to FIG. 7, if or after one or more of the conditions occur that are described above in FIG. 7, then an appropriate signal may be communicated to the vehicle 10, tailgate 20, cover 22, cover control module 21, and/or operator notifying them of the open cover 22. A position of the cover and/or one or more panels may be checked. If the cover and/or one or more panels is determined to be in an open position, a signal may be communicated by the cover and/or vehicle control module to a computer, processor, the vehicle 10, the cover 22 cover control module 21, and/or a mechanism to automatically move the cover 22 or at least the rear panel 24*a* into the closed configuration.

Figure 9:
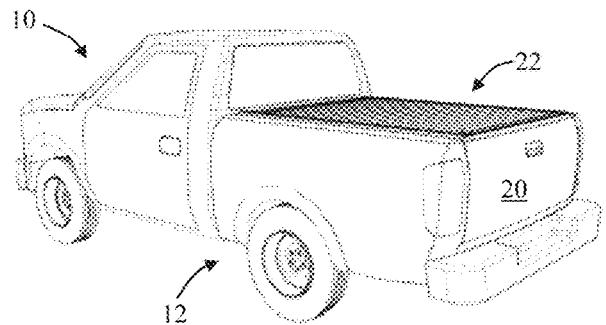
FIG. 9 is a perspective view of a vehicle and cover.

Another vehicle 10 is shown in FIG. 9. The vehicle 10 may be substantially the same as the vehicle illustrated and described in FIG. 1 and/or any of the other figures; and thus, those remarks may apply to the vehicle 10 in FIG. 9 and vice versa. A cover 22 may be located or placed over a top or open end of the cargo area 12. The cover 22 may include one or more panels. However, unlike the panels of the cover 22 of FIG. 1 that fold or pivot relative to each other and the cargo area 12, the panels of cover 22 of FIGS. 9-13 may be slats or members that can be moved, unrolled, and rolled between open and closed configurations. A spool about which the cover or slats are rolled and unrolled may be provided at or within the front end 18 of the cargo area 18, at or within the tailgate 20. In some configurations, the spool may be provided at or within one or both of the side walls 16*a*, *b*. In such a configuration, the cover 22 would be rolled and unrolled in a cross-car direction, from driver to passenger side or passenger to driver side. In some configurations, the cover 22 may be rolled into and out of a cartridge or canister provided in the cargo area.

The cover 22 is in the closed configuration in FIG. 9. While the tailgate 20 may be opened or lowered from its closed configured illustrated in FIG. 9 to the open configuration illustrated in FIGS. 11 and 12, doing so with at least the cover 22 in its closed configuration may cause damage the tailgate 20, the cover 22, or a combination thereof. More specifically, for example, when the tailgate 20 and the cover 22 are both in the closed configuration, a bottom surface 28 of the cover 22 may be in contact with a top surface of the tailgate 20. This contact may be intentional and/or desirable to restrict or prevent debris, fluid, or other materials from entering the cargo area 12, to restrict or prevent access into the cargo area 12, and/or to restrict or prevent objects from exiting the cargo area 12. However, by opening or lowering the tailgate 20 while the cover 22 is in contact the tailgate 20, the top surface of the tailgate 20 may become scratched or damaged, a bottom surface 28 of the cover 22 may become scratched or damaged, or the overall cover 22 may be damaged. Thus, it may be preferable to at least partially vent, open or move the cover 22 into an open configuration before or while the tailgate 20 is opened or lowered.

Figure 10:
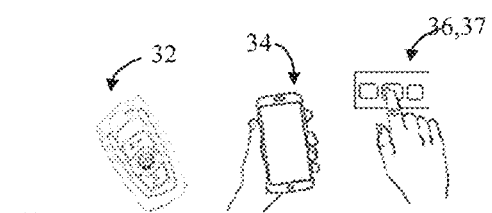
FIG. 10 shows schematic representations of various devices for communicating signals to or between the vehicle and/or cover of FIG. 9.
Figure 11:
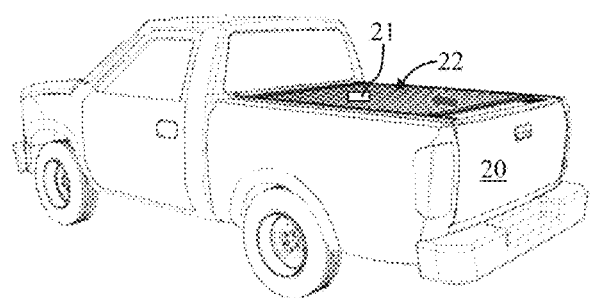
FIG. 11 is a perspective view of the vehicle and cover of FIG. 9.

Referring now to FIGS. 10 and 11, a vehicle owner or operator who desires to open or lower the tailgate 20 may do so by generating one or more signals 40. The one or more signals 40 may be generated by depressing or actuating one or more buttons on a key fob or remote control 32; by using a mobile device or app 34; by activating one or more buttons 36 on a key pad 37 located inside or outside of the vehicle 10, or on the cover 22 or one or more panels thereof; by using voice or touch commands; a hands free command; with a foot, hand, or other motion—or touch free proximity—activated sensor; and/or by manually manipulating or actuating the tailgate latch 38. The one or more signals 40 may be generated and then transmitted to the vehicle 10, tailgate 20, cover control module 21, cover 22, computer, processor, and/or one or more mechanisms that may function to cause the cover 22 and/or tailgate 20 to move into an open configuration. For example, the one or more mechanisms may be one or more actuators, piston and cylinders, linear actuators, gas shocks or springs, motors, or the like.

The vehicle and/or cover control module 21, one or more sensors, computer, processor, and/or to one or more mechanisms that receive the signal 40 may check for a position of the tailgate 20 and the cover 22. If the cover 22 is already in an at least partially open configuration, then the cover control module 21 may cause the tailgate 20 to be moved or lowered into the desired open configuration according to the signal. The tailgate 20 may be moved or lowered into the open configuration manually or with one or more mechanisms (i.e., actuators, piston and cylinders, shocks or springs, or a combination thereof).

Figure 12:
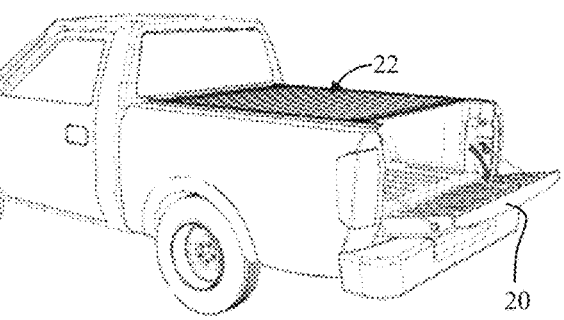
FIG. 12 is a perspective view of the vehicle and cover of FIG. 9.

On the other hand, if the cover and/or vehicle control module 21, computer, processor, sensors, and/or the one or more mechanisms determine that the cover 22 is in the closed configuration, then the cover control module 21 may cause the one or more mechanisms to move or retract the cover 22 into an at least partially open configuration, as shown in FIG. 11. After or while the cover 22 is being moved in the at least partially open configuration, the tailgate 20 may be moved or lowered into the desired open configuration, as shown in FIG. 12, without interfering, crashing into, or otherwise causing damage to the tailgate 20, the cover 22, or both.

After the tailgate 20 has been lowered or moved into a sufficiently open configuration, or while the tailgate 20 is being lowered or moved into the open configuration, the cover 22 may move into the closed configuration. Alternatively, after the tailgate 20 has been lowered or moved into the open configuration, or while the tailgate 20 is being lowered, the cover 22 may be moved into a fully open configuration.

Before, during, and/or after the cover 22 and/or the tailgate 20 are being moved into, from, or between the open and closed configurations, the cover control module 21 may cause one or more visual lights and/or audible sounds or signals to emit to notify a user, operator, or bystander that the tailgate 20 and/or cover 22 are moving or will be moving soon. After the cover 22 and/or the tailgate 20 are in the desired position based on the signal, the cover control module 21 may cause one or more visual lights and/or audible sounds or signals to emit to notify a user or operator that the operation or movement of the parts is complete. The one or more lights or sounds may emit from one or more devices provided on the cover 22, on the vehicle 10 such as the vehicle speakers or displayed on the vehicle instrument panel, or even on a vehicle mirror or controller, as discussed further below with reference to FIGS. 21-23, inside of the passenger area 14, on the remote or key fob, on the mobile device or app, or a combination thereof.

Figure 13:
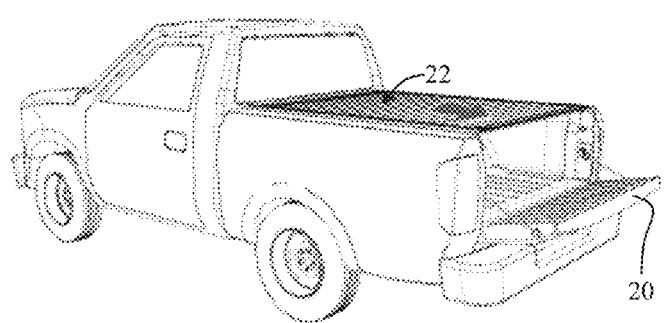
FIG. 13 is a perspective view of the vehicle and cover of FIG. 9.

With continued reference to FIG. 13 and additional reference back to FIG. 7, if or after the vehicle 10 is put into a particular gear, for example, shifted from park to reverse, or neutral, or drive, or any combination thereof, a signal may be sent or processed by or to a computer, processor, the vehicle 10, the cover 22 and/or a mechanism to move the cover 22 into an open configuration before or while the tailgate 20 is moved or raised into a closed configuration. After or while the tailgate 20 is moved into the closed configuration, the cover 22 may then be moved into the closed configuration. If the tailgate 20 was moved or raised into its closed configuration while the cover 22 or rear panel 24a thereof was in the closed configuration, the tailgate 20 may crash into the cover 22, which may undesirably damage the cover 22, the tailgate 20, or both. The cover 22 may move into the closed configuration while the tailgate 20 is being moved into the closed configuration and is a sufficient distance away from the cover to prevent a crash condition between the cover 22 and the tailgate 20.

If or after the vehicle transmission is put into a particular gear, for example, shifted from park to reverse, or neutral, or drive, or any combination thereof, or after the vehicle 10 is turned ON or the accessory mode is turned ON, the vehicle 10, cover 22, the vehicle and/or cover control module 21, computer, processor, or a combination thereof may check for a position of the cover 22 and/or one or more panels thereof. If the cover 22 is in an open configuration, a signal (audible and/or visual) may be communicated to the vehicle 10, cover 22, or operator of the vehicle 20 to notify them of the open cover 22. A signal may be communicated to a computer, processor, the vehicle 10, the cover 22, cover control module 21, and/or a mechanism to automatically move the cover 22 into an at least partially closed configuration or a fully closed configuration. The cover 22 and/or control module 21 may rely on an anti-pinch apparatus 23 described below at FIG. 14 to prevent damage to the cover 22 and/or an object that may be in the cargo area due to movement or closing of the cover 22.

If or after the vehicle 10 exceeds a predetermined speed 48 while the vehicle 10 and cover 22 are in the configuration illustrated and described in FIG. 13, a signal may be sent or processed by or to the cover control module 21, computer, processor, the vehicle 10, the cover 22 and/or a mechanism to move the cover 22 into an open configuration before or while the tailgate 20 is moved or raised into a closed configuration. After or while the tailgate 20 is moved into the closed configuration, the cover 22 may then be moved into the closed configuration.

If the vehicle remote or key fob 32 is out of range from the vehicle 10, cover 22, or cover control module 21, for a predetermined amount of time, if rain or precipitation is sensed or forecasted, and/or if a predetermined amount of time 52 has elapsed while the vehicle 10 and cover 22 are in the configuration in FIG. 13, a signal may be sent by or to the control module 21, computer, processor, the vehicle 10, the cover 22 and/or a mechanism to move the cover 22 into an open configuration before the tailgate 20 is moved or raised into a closed configuration. After the tailgate 20 is in the closed configuration, the cover 22 may then be moved into the closed configuration.

Figure 14:
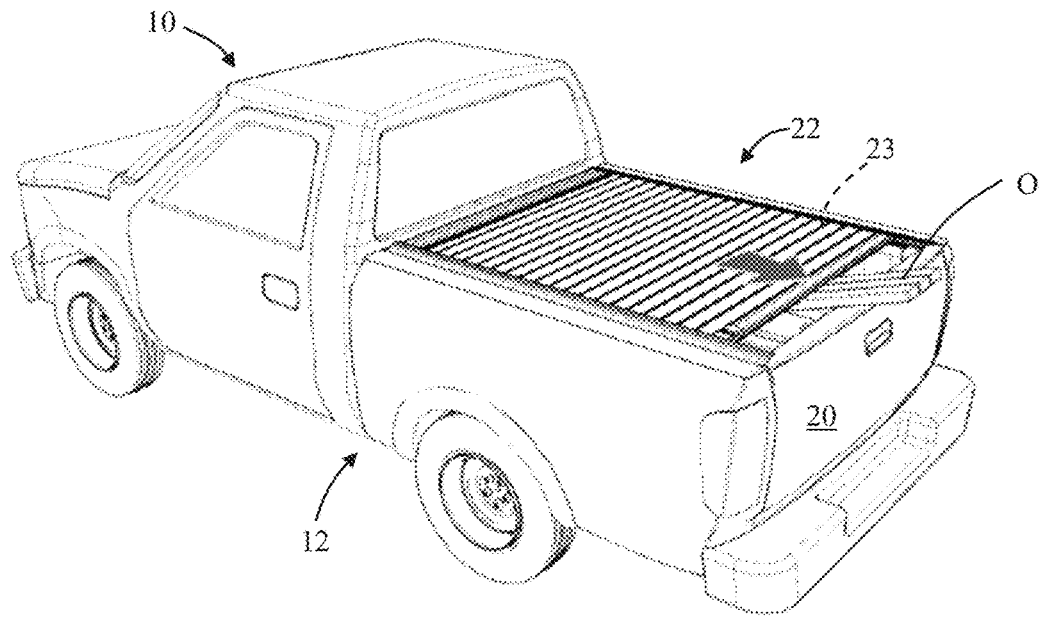
FIG. 14 is a perspective view of a vehicle and cover.
Figure 24:
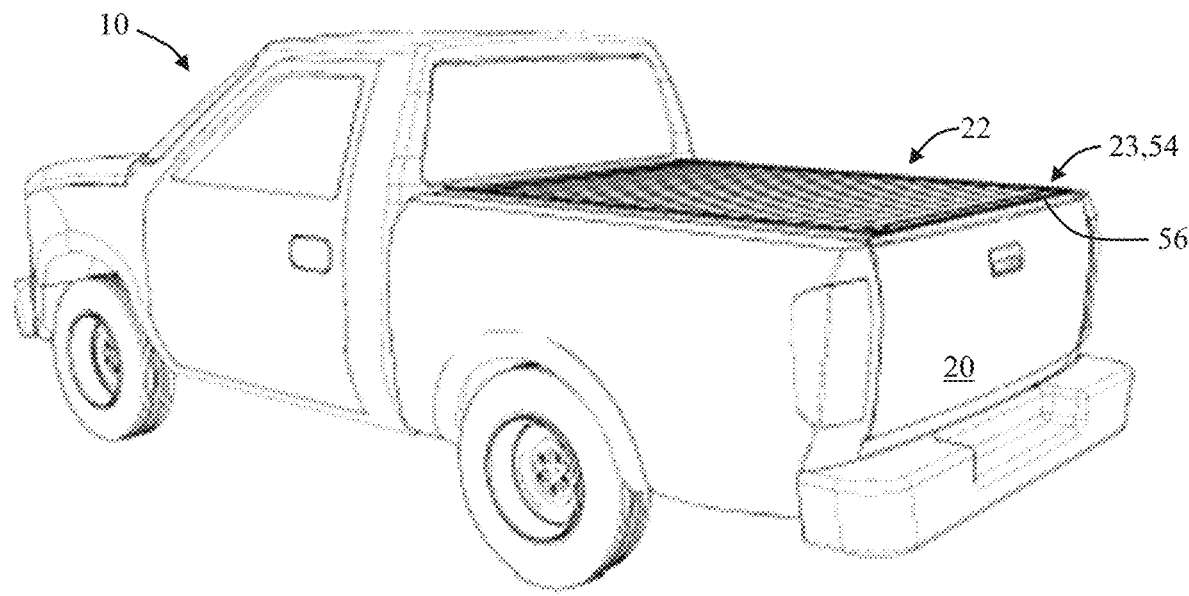
FIG. 24 is a perspective view of a vehicle.

FIG. 14 illustrates a vehicle 10 with a cover 22 over the cargo area 12. The vehicle 10, cover 22, and/or cover control module 21 may include an anti-pinch apparatus 23. The anti-pinch apparatus 23 may be configured to detect presence of an object O in the cargo area 12. The anti-pinch apparatus 23 may be configured to detect presence of one or more objects O that may interfere with moving the cover 22 into the closed configuration. For example, if an object O is located between the cover 22 and the cargo area 12 or the tailgate 20 (or any other side wall of the cargo area 12), the cover 22, the tailgate 20, and/or the object O may be damaged if the cover 22 is moved into a closed configuration. Thus, if an object O is detected by the anti-pinch apparatus 23, the cover 22 may be configured to stop and/or retract back into an open (or further open) position. In other configurations, if an object O is detected by the anti-pinch apparatus 23, the cover 22 may be configured to move into the closed configuration but stop just before or just after the cover 22 makes initial contact with the object O. This may advantageously hold the object in place without damaging the object, the cover 22, the cargo area 12, walls of the cargo area 12, or a combination thereof. The anti-pinch apparatus 23 may include one or more light sensors or curtains, proximity sensors, cameras, radar, and/or Lidar device in the cover, the one or more panels, in the vehicle, the cargo area, the one or more side walls, or a combination thereof. The anti-pinch apparatus 23 may detect presence or absence of an object O in the cargo 12 that may interfere with closing, opening, or other actuation of the cover 22. The anti-pinch apparatus 23 may include one or more switches, computers, processors, force, or resistance gauges. The anti-pinch apparatus may be configured to measure or monitor a voltage draw or power draw of a motor. When contact is made with an object O, the resistance acting on the cover 22 or one or more panels may cause the motor to work harder and thus draw more voltage or power. The increase in voltage or power draw may be sensed by a computer, processor, and used to determine or predict an object O that is interfering with closing, opening, or other actuation of the cover or one or more panels. With reference to FIG. 24, the anti-pinch apparatus 23 may be in the form of one or more strips 54. The one or more strips 54 may be arranged at any region of the cover 22 and/or cargo area. The one or more strips 54 may be arranged at the leading edge 56 of the cover 22. The anti-pinch apparatus 23 may be a weather strip or member that has two or more spaced apart electrodes or wires within. When the apparatus 23 is compressed (by way of the moving cover 22 making contact with the object O or tailgate 20 (FIG. 14)), the spaced apart electrodes or wires are brought closer together and/or into contact with one another, thus allowing the vehicle control module and/or the cover control module to detect a change in capacitance and/or an increase or decrease in current or resistance. When the change is detected, the vehicle or cover control module may cause the cover 22 to slow or stop moving and/or retract into a further open position. The anti-pinch apparatus 23 may be of the type described in U.S. Pat. No. 9,477,003B2, U.S. Pat. No. 6,483,054B2, U.S. Pat. No. 8,397,581B2, US20180364387A1 and the like, which are incorporated by reference herein for all purposes.

Figure 25:
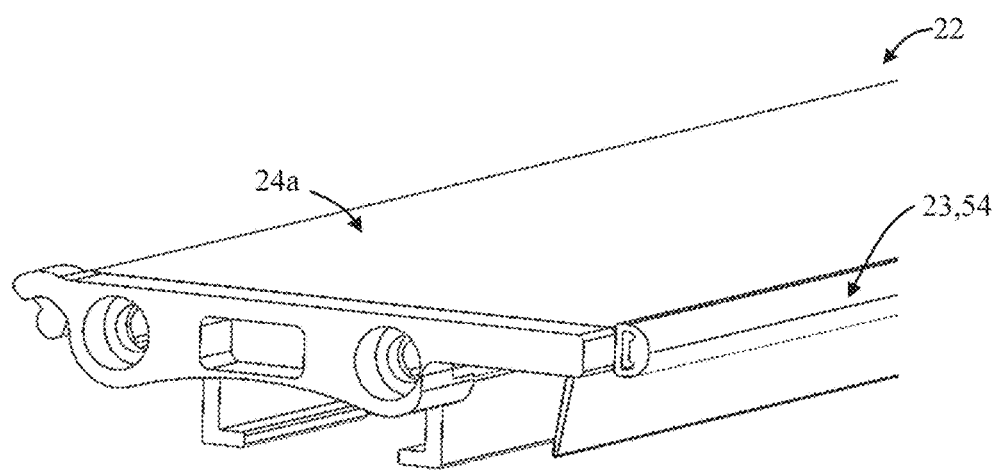
FIG. 25 is a perspective view of a rear panel and anti-pinch mechanism.
Figure 26A:
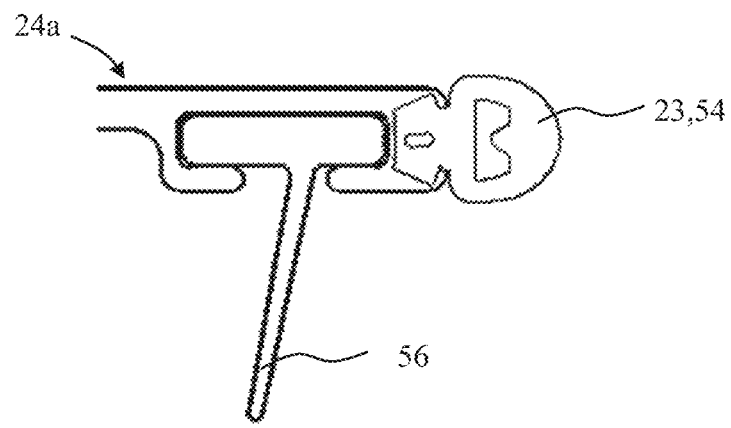
FIG. 26A is a cross-sectional view of a rear panel and anti-pinch mechanism.
Figure 26B:
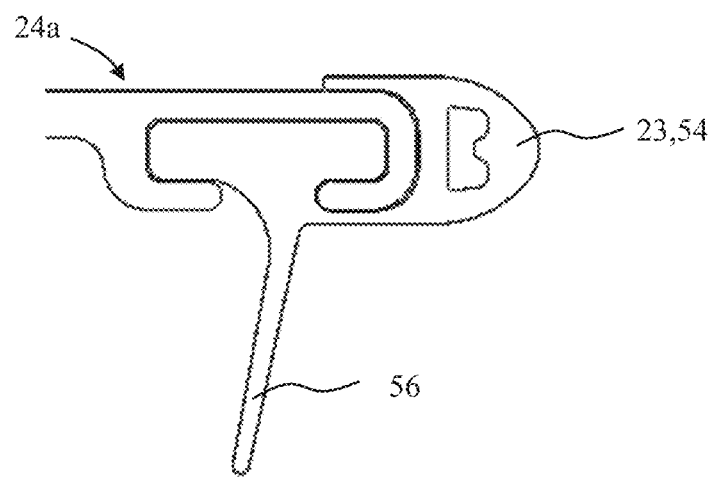
FIG. 26B is a cross-sectional view of a rear panel and anti-pinch mechanism.

FIG. 25 illustrates a panel of the cover 22. The panel may be the panel 24a that is immediately adjacent to the tailgate 20 in FIG. 24. The edge of the panel 24a comprises the anti-pinch apparatus 23 in the form of a weather strip 54. In FIG. 26A, the weather strip 54 is received into a channel defined in the panel 24A, with or without adhesive. The weather strip 54 may also be co-molded or extruded with the panel 24A. The weather strip 54 is a separate piece from a second weather strip or seal 56 used to prevent fluid and/or debris egress into the cargo area. In FIG. 26B, the weather strip 54 is also received into a channel defined in the panel 24A, with or without adhesive. The weather strip 54 may also be co-molded or extruded with the panel 24A. The weather strip 54 is an integral piece with the second weather strip or seal 56 used to prevent fluid and/or debris egress into the cargo area.

Figure 15:
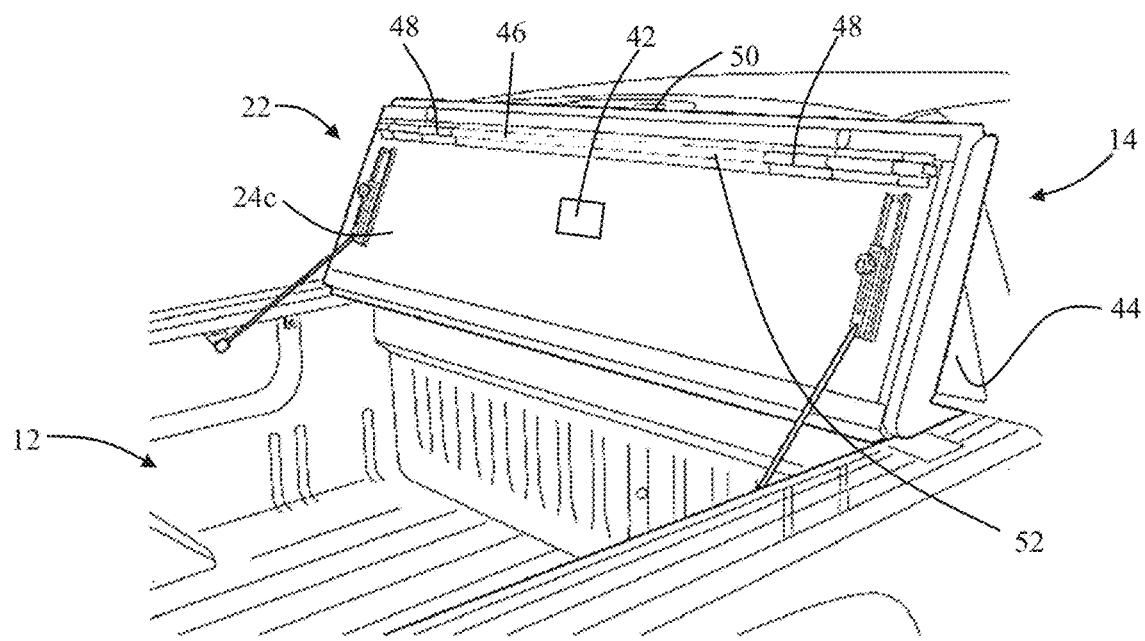
FIG. 15 is a perspective view of portion of a vehicle and cover.

FIG. 15 illustrates a rear portion of the vehicle 10, with the cover 22 at least partially moved into an open configuration. In FIG. 15, a bottom or B-side of one of the panels is shown. The panel may be the third panel 24c (refer to FIG. 1 for orientation). It is understood that one or more of the features or elements described with respect to FIG. 15 may be incorporated into any cover, regardless of the number or type of panels it has. For example, these elements may be incorporated into a single panel cover that tilts or pivots relative to the cargo area 12.

The cover 22, panel 24c, or B-side of the cover 22 or panel 24c may include one or more cameras 42. The camera 42 may provide visual access to an inside of the cargo area 12 while the panel 24c and/or cover 22 is in a closed configuration. The camera 42 may provide visual access to an area behind the vehicle 12 when the cover 22 is in an open configuration. The camera 42 may provide visual access to a back and/or side of the vehicle 12 which may be desirable when the cover 22 folded up against a rear window 44 of the passenger area 14 and blocking visibility though the window 44. The camera 42 may transmit picture and/or video and broadcast on a screen provided on a vehicle instrument panel or dashboard screen, rear view mirror, mobile device, or a combination thereof. The camera 42 may be a security feature that may turn on when movement or presence is sensed near the vehicle 10, cover 22, or both.

The cover 22, panel 24c, or B-side of the cover 22 or panel 24c may include one or more brake lights 46 and/or turn signals 48. The brake light 46 may be a CHMSL, which is a center high-mounted stop lamp. The brake light 46 and/or turn signals 48 may be desirable when the cover 22 is folded up against the back window 44 of the passenger area 14 and blocking the brake light 50 or CHMSL mounted to the passenger area 14 of the vehicle 10 or other objects are projecting from inside of the cargo area 12.

The cover 22, panel 24c, or B-side of the cover 22 or panel 24c may include a cargo light 52. The cargo light 52 may function to illuminate the cargo box 12 when the cover 22 or panels are in a closed or open configuration. The cargo light 52 may be a flood light to illuminate a back and/or side of the vehicle 10. The cargo light 52 may be activated or turned on when one or more of the panels are in the open or closed configuration and/or when surrounding light is dark or dim. The cargo light 52 may be activated with a key fob, mobile device, and/or by actuating one or more buttons inside the vehicle 10 or outside of the vehicle, such as on one or more of the cargo area 12 walls or cover 22.

FIG. 16 illustrates a vehicle 10 that includes a cargo area 12. The cargo area 12 is defined by a pair of opposing side walls 16, a front wall 18 adjacent the passenger area 14, and a rear wall or tailgate 20. The tailgate 20 is movable between a closed configuration (FIGS. 16, 18) and an open configuration (FIGS. 19, 20). A cover 122 is provided over the cargo area 12. The cover 122 includes a control module 121 and a liftgate 124 that can be moved between a closed configuration (FIGS. 16, 20) and an open configuration (FIGS. 18, 19). The control module 121 may be a cover control module and/or a vehicle control module (i.e., ECU, ECM, BCM, etc.)

Referring now to FIGS. 16 and 17, a vehicle owner or operator who desires to open or lower the tailgate 20 may depress or actuate a button or lever on a key fob or remote control 32, a mobile device or app 34, a button 36 on a keypad 37 located on an inside or outside of the vehicle 10 and/or cover 122, actuate a tailgate latch 38 on the tailgate 20, and/or actuate one or more hands free switches like a foot or hand proximity sensor, to generate and communicate one or more signals 40 to the vehicle 10, tailgate 20, cover 122 and/or control module 121. The one or more signals 40 may be transmitted to the cover 122, control module 121, computer, processor, and/or to one or more mechanisms that function to check a position of the panel 124 or liftgate. If it is determined that the panel 124 or liftgate is in a closed or powered position, the one or more signals may be communicated to the latching mechanism to at least partially open, move, pivot, or otherwise move the panel 124 or liftgate 124 out of contact with the tailgate 20, as illustrated by the arrow in FIG. 18. For example, the panel 124 or liftgate 124 may be at least partially moved or pivoted about hinge 126 (FIG. 19) up and away from the tailgate 20. For example, the one or more mechanisms may be one or more actuators, piston and cylinders, gas shocks or linear actuators, springs, or the like. With the liftgate 124 out of contact with the tailgate 20 or reduced contact or pressure provided therebetween, the tailgate 20 can then be lowered and will clear the liftgate 124 while being opened or lowered as shown in FIG. 19, without interfering with or causing damage to the tailgate 20, the liftgate 124, the cover 122, or a combination thereof.

Referring now to FIG. 20, while or after the tailgate 20 has been fully lowered or moved into its open configuration, or while or after the tailgate 20 has been moved to a desired position somewhere between a fully closed and a fully open configuration, the cover 122 or control module 121 may cause the liftgate 124 to move back down into the closed configuration.

Alternatively, while or after the tailgate 20 has been fully lowered or moved into its open configuration, or while or after the tailgate 20 has been moved to a desired position somewhere between a fully closed and a fully open configuration, one or more of the other panels (i.e., 24b, c, etc.) or the rest of the cover 22 may be moved into an open configuration.

In FIG. 20, a vehicle 10 is shown with its tailgate 20 in an opened or lowered configuration and the cover 122 or liftgate 124 is in a closed configuration. With additional reference back to FIG. 7, if or after the vehicle 10 is put into a particular gear, for example, shifted from park to reverse, or neutral, or drive, or any combination thereof, or after the vehicle 10 is turned ON, and/or after the accessory mode is turned ON, a signal may be generated and sent by or to a computer, processor, the vehicle 10, the cover 122, control module 121 and/or a mechanism to check a position of the liftgate 124 or cover 122. If it is determined that the cover 122 or liftgate 124 is in a closed position, more or more signals may be sent to the mechanism to move the cover 122 or the liftgate 124 into an open configuration before or while the tailgate 20 is moved or raised into a closed configuration. While the tailgate 20 is moving into the closed configuration, or after the tailgate 20 is in the closed configuration, the cover 122 or liftgate 124 may then be moved into the closed configuration. If the tailgate 20 was moved or raised into its closed configuration while the cover 122 or liftgate 124 was in the closed configuration, the tailgate 20 may crash into the cover 122 and/or the liftgate 124, which may undesirably damage the cover 122, the liftgate 124, the tailgate 20, or a combination thereof.

Additionally, or alternatively, if or after the vehicle 10 exceeds a predetermined speed 48 while the tailgate 20 and cover 122 are in the illustrated open position, one or more signals may be generated and sent by or to a computer, processor, the vehicle 10, the cover 122, control module 121, and/or a mechanism to check a position of the liftgate 124 or cover 122. If the liftgate 124 or cover 122 is in an open position, one or more signals may be sent to the mechanism to move the cover 122 or at least the liftgate 124 into an open configuration before or while the tailgate 20 is moved or raised into a closed configuration. After the tailgate 20 is in the closed configuration, the cover 122 or liftgate 124 may then be moved into the closed configuration.

Additionally, or alternatively, if the vehicle remote or key fob 32 is out of range from the vehicle 10, cover 122, and/or control module 121 for a predetermined amount of time, if rain or precipitation is sensed or forecasted, and/or if a predetermined amount of time 52 has elapsed while the tailgate 20 and cover 122 are in the open configuration, a signal may be generated and sent to a computer, processor, the vehicle 10, the cover 122, control module 121, and/or a mechanism to check a position of the liftgate 124 or cover 122. If the liftgate 124 or cover 122 is in a closed position, one or more signals may be sent to the mechanism to move the cover 122 or at least the liftgate 124 into an open configuration before or while the tailgate 20 is moved or raised into a closed configuration. After the tailgate 20 is in the closed configuration, the cover 122 or liftgate 124 may then be moved into the closed configuration.

Figure 21:
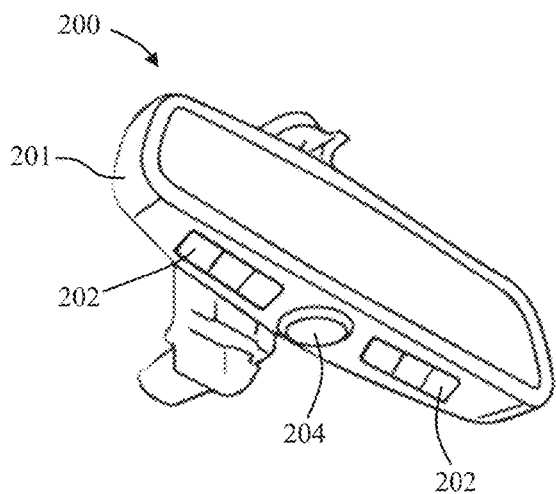
FIG. 21 is a perspective view of a rear-view mirror.

FIG. 21 illustrates a mirror 200. The mirror 200 may be provided inside any vehicle disclosed herein. The mirror 200 may be a rear-view mirror. The mirror 200 may be an aftermarket accessory that can be installed in the vehicle. The mirror 200 may be installed in the vehicle by the OEM. The mirror 200 may be connected to the vehicle computer and/or to the cover control module. The mirror 200 may include the cover control module.

The mirror 200 may include a housing 201. The mirror 200 may include one or more buttons, knobs, or other features 202 for actuating any of the covers, panels, tailgate. The mirror 200 may include one or more lights and/or speakers 204 for the control module to activate one or more alerts (audible and/or visible) during any one or more of the conditions disclosed herein. For example, the one more lights and/or speakers 204 may be activated by the control module if the cover or one or more panels there is in in an at least partially open or closed configuration; during movement of the cover or one or more panels between open and closed position; if closure of the cover and/or one or more panels is delayed or stopped due to an object being in the way of the panel or cover (i.e., the anti-pinch feature disclosed herein); if a key fob or other sensor is out of communication with the cover and/or control module and the tailgate and/or cover is open or unlocked; if the cover and/or one or more panels are opened or become lose during a driving condition; or any combination thereof.

The mirror 200 may be connected to one or more cameras attached to the cover, the one or more panels, or both. When activated, the mirror 200 may broadcast video from the one or more cameras to show an area behind or to the side of the vehicle. This may be advantageous, especially when the cover is in an open configuration and cargo is in the cargo area thus restricting or hindering view behind or around the vehicle, for example as disclosed above at FIG. 15 (See camera 42). One or more toggle switches may be provided to switch an output on the mirror 200 from a traditional mirror to a video feed from the one or more cameras. In some configurations, the vehicle and/or cover control module may automatically turn on a camera feed to the mirror 200 when the cover is in an open position and blocking the rear cab window (See FIG. 15). In some configurations, the vehicle and/or cover control module may automatically turn on a camera feed to the mirror 200 when the rear cab window is blocked by an object or cargo. In such a configuration, a proximity sensor may be arranged to monitor if an obstruction is present that inhibits visibility though the rear window.

Figure 22:
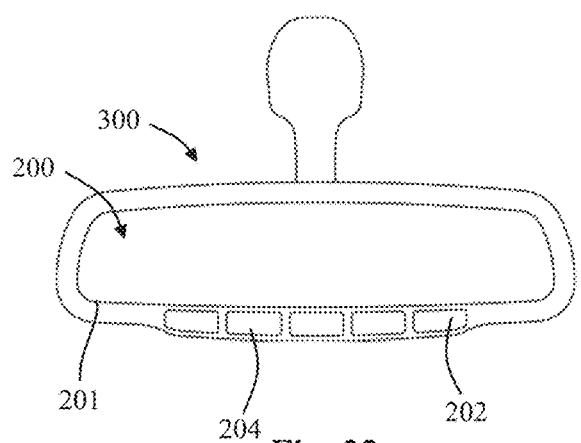
FIG. 22 is a front view of a rear-view mirror.

FIG. 22 illustrates a frame or skin 300 that may fit over a mirror 200 or housing 201 thereof. In this regard, the skin 300 may be a controller that includes one or more of the functionalities, controls, and buttons (i.e., 202, 204, control module, etc.) as mirror 200 of FIG. 21 but may be added, installed, or attached to a factory OEM mirror. This would allow a user or vehicle owner to add the skin 300 onto a stock or factory installed vehicle mirror and be able to control one or more of the covers and have any of the alerts discussed above.

Figure 23:
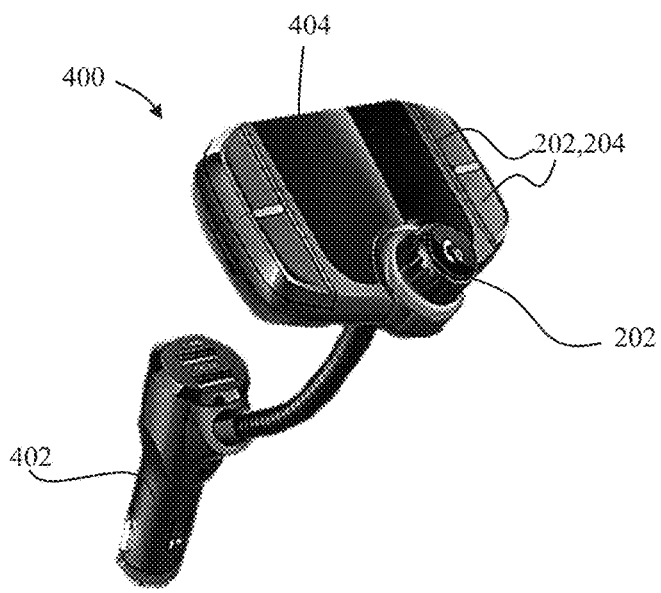
FIG. 23 is a perspective view of a controller.

FIG. 23 illustrates a controller 400 that may include one or more of the functionalities, controls, and buttons (i.e., 202, 204, control module, etc.) as mirror 200 and skin 300 of FIGS. 21 and 22. The controller 400 may have a plug 402 for attaching to a vehicle power outlet. The controller 400 may also function as a telephone or mobile device holder or may be installed or connected to a vehicle dashboard or instrument panel. The controller 400 may have a screen 404 for viewing one or more codes, sensors, or messages regarding the cover and/or the position of one or more of the panels thereof. The screen 404 may be connected to one or more of the cameras of the cover.

Figure 27:
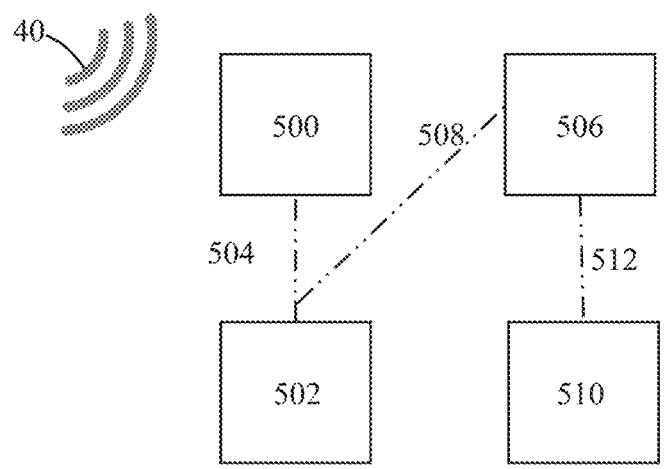
FIG. 27 is a schematic illustration of the method disclosed herein.

FIG. 27 shows a schematic of operation of the method disclosed herein. The vehicle control module 500 (ECU, ECM, BCM, etc.) may receive one or more signals, for exampe signal 40 from any of the sources disclosed herein. The signal 40 may be an operator instructing the vehicle 10 to lower or open a tailgate 20 (FIG. 1, 9, 16, etc.). The vehicle control module 500 may instruct the one or more mechanisms 502 configured to move or lower the tailgate 20 to move or lower the tailgate 20 via line or signal 504. The cover control module 506 may monitor and/or intercept line or signal 504 via line 508 and perform a check on the position of the cover 22, 122 or panel 24a, 124 before the tailgate 20 is moved. If the cover or panel is determined to be in a closed position, the cover control module 506 may communicate via line or signal 512 to the one or more mechanisms 510 operable to move the cover 22, 122 or panel 24a, 124 into an open position before the one or more mechanism 502 configured to move or lower the tailgate 20 begin to actually move or lower the tailgate 20. After the cover 22, 122 or panel 24a, 124 is moved a sufficient distance away from the tailgate 20, the control module 500 and/or 506 may communicate via line or signal 504 or 508 to the one or more mechanisms 502 operable to move the tailgate 20.

In another configuration, the vehicle control module 500 (ECU, ECM, BCM, etc.) may receive one or more signals, for exampe signal 40 from any of the sources disclosed herein. The signal 40 may be an operator instructing the vehicle 10 to close or raise the tailgate 20 (FIG. 1, 9, 16, etc.). The vehicle control module 500 may instruct the one or more mechanisms 502 configured to move or raise the tailgate 20 to do so via line or signal 504. The cover control module 506 may monitor and/or intercept line or signal 504 via line 508 and perform a check on the position of the cover 22, 122 or panel 24a, 124 before the tailgate 20 is moved. If the cover or panel is determined to be in a closed position, the cover control module 506 may communicate via line or signal 512 to the one or more mechanisms 510 operable to move the cover 22, 122 or panel 24a, 124 into an open position before the one or more mechanism 502 configured to move or raise the tailgate 20 begin to actually move or raise the tailgate 20. After the cover 22, 122 or panel 24a, 124 is opened and/or moved a sufficient distance away from the tailgate 20, the control module 500 and/or 506 may communicate via line or signal 504 or 508 to the one or more mechanisms 502 operable to move the tailgate 20 into the desired position.

Figure 28:
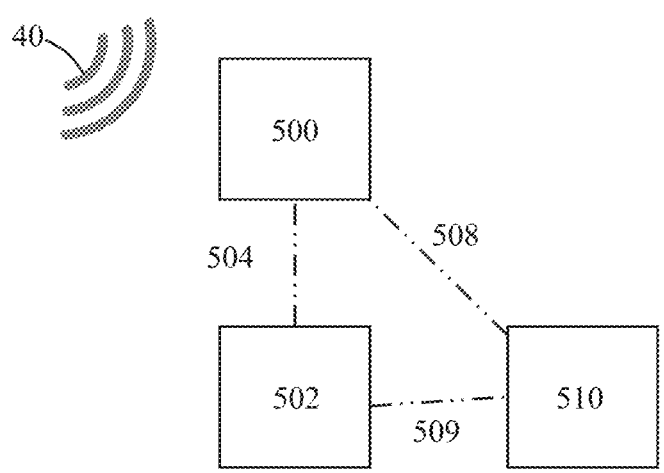
FIG. 28 is a schematic illustration of the method disclosed herein.

FIG. 28 shows a schematic of operation of the method disclosed herein. The vehicle control module 500 (ECU, ECM, BCM, etc.) may receive one or more signals, for exampe signal 40 from any of the sources disclosed herein. The signal 40 may be an operator instructing the vehicle 10 to lower or open a tailgate 20 (FIG. 1, 9, 16, etc.). The vehicle control module 500 may first perform a check on the position of the cover 22, 122 or panel 24a, 124 before the tailgate 20 is moved. If the cover or panel is determined to be in a closed position, the vehicle control module 500 may communicate via line or signal 508 to the one or more mechanisms 510 operable to move the cover 22, 122 or panel 24a, 124 into an open position before the one or more mechanism 502 configured to move or lower the tailgate 20 begin to actually move or lower the tailgate 20. After the cover 22, 122 or panel 24a, 124 is moved a sufficient distance away from the tailgate 20, the control module 500 and/or mechanism 510 may communicate via line or signal 504 or 509 to the one or more mechanisms 502 operable to move the tailgate 20.

In another configuration, the vehicle control module 500 (ECU, ECM, BCM, etc.) may receive one or more signals, for exampe signal 40 from any of the sources disclosed herein. The signal 40 may be an operator instructing the vehicle 10 to raise or close a tailgate 20 (FIG. 1, 9, 16, etc.). The vehicle control module 500 may first perform a check on the position of the cover 22, 122 or panel 24a, 124 before the tailgate 20 is moved. If the cover or panel is determined to be in a closed position, the vehicle control module 500 may communicate via line or signal 508 to the one or more mechanisms 510 operable to move the cover 22, 122 or panel 24a, 124 into an open position before the one or more mechanism 502 configured to move or lower the tailgate 20 begin to actually move or raise or close the tailgate 20. After the cover 22, 122 or panel 24a, 124 is moved a sufficient distance away from the tailgate 20, the control module 500 and/or mechanism 510 may communicate via line or signal 504 or 509 to the one or more mechanisms 502 operable to raise or close the tailgate 20. In such a configuration, the control module 500 may be programed by the vehicle manufacturers to first check a position of the panel or cover or may be reprogrammed in an aftermarket operation.

It is understood that any of the method steps described herein can be performed in virtually any order. Moreover, one or more of the following method steps can be combined with other steps; can be omitted or eliminated; can be repeated; and/or can separated into individual or additional steps.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

The invention claimed is:

1. A method of operating a tonneau cover, the method comprises:
    transmitting one or more signals to a control module to cause the tonneau cover to move from an open position towards a closed position;
    detecting presence of an object that is located in between an end of the tonneau cover and a tailgate of a vehicle and that interferes with further moving the tonneau cover into the closed position;
    stopping movement of the tonneau cover after the end of the tonneau cover makes contact with the object; and
    holding the object in place with the tonneau cover in between the end of the tonneau cover and the tailgate.

2. The method according to claim 1, wherein the method comprises causing one or more lights to blink, flash, or turn on after the stopping step.

3. The method according to claim 1, wherein the method comprises moving the tonneau cover towards the open position after the stopping step so that the tonneau cover is moved back away from the object.

4. The method according to claim 3, wherein the method comprises moving the tonneau cover towards the closed position after the step of moving the tonneau cover towards the open position.

5. The method according to claim 1, wherein after a transmission gear of the vehicle is changed, the method comprises checking a position of the tonneau cover.

6. The method according to claim 1, wherein before the holding step, the method comprises causing the tonneau cover to revert back towards an open position.

7. The method according to claim 6, wherein before the holding step, the method comprises causing the tonneau cover to move towards the closed position and then initiating the holding step.

8. The method according to claim 7, wherein the detecting step includes using one or more switches, computers, processors, force, or resistance gauges, or a combination thereof.

9. The method according to claim 7, wherein the method comprises monitoring a voltage draw or power draw of a motor associated with moving the tonneau cover.

10. The method according to claim 1, wherein the method comprises monitoring a voltage draw or power draw of a motor associated with moving the tonneau cover.

11. The method according to claim 1, wherein the detecting step includes using one or more weather strips.

12. The method according to claim 9, wherein the tonneau cover is a rolling tonneau cover.

13. The method according to claim 1, wherein the transmitting step includes using a key fob.

14. The method according to claim 7, wherein the transmitting step includes using a touch pad or keypad.

15. The method according to claim 4, wherein the keypad is located on a bed cap attached to one or more walls or tailgate defining a cargo area of the vehicle, on the one or more panels of the tonneau cover, or on a pillar of the cab of the vehicle.

16. The method according to claim 1, wherein the transmitting step includes using a capacitive touch device.

17. The method according to claim 1, wherein the method comprises emitting an audible and/or visual signal after the detecting step, during or after the stopping step, and/or during or after the holding step.

18. The method according to claim 1, wherein the method comprises emitting an audible and/or visual signal if the tonneau cover or one or more panels of the tonneau cover are moved without presence of a key or fob or other remote or mobile device.

19. The method according to claim 5, wherein if after the checking step the cover is in the open position, then emitting an audible and/or visual signal.

20. A method of operating a tonneau cover, the method comprises:
- transmitting one or more signals to a control module to cause the tonneau cover to move from an open position towards a closed position;
- detecting presence of an object that is located in between an end of the tonneau cover and a tailgate of a vehicle and that interferes with further moving the tonneau cover into the closed position;
- stopping movement of the tonneau cover after the end of the tonneau cover makes contact with the object;
- moving the tonneau cover towards the open position after the stopping step so that the tonneau cover is moved back away from the object;
- moving the tonneau cover towards the closed position after the moving step, and
- holding the object in place with the tonneau cover in between the end of the tonneau cover and the tailgate.

* * * * *